(12) United States Patent
Judkins et al.

(10) Patent No.: US 10,396,593 B1
(45) Date of Patent: Aug. 27, 2019

(54) RAPID SHUTDOWN OF PHOTOVOLTAIC SYSTEMS

(71) Applicant: SunPower Corporation, San Jose, CA (US)

(72) Inventors: Zachary S. Judkins, Berkeley, CA (US); Jonathan L. Ehlmann, Austin, TX (US)

(73) Assignee: SUNPOWER CORPORATION, San Jose, CA (US)

( * ) Notice: Subject to any disclaimer, the term of this patent is extended or adjusted under 35 U.S.C. 154(b) by 126 days.

(21) Appl. No.: 15/642,134

(22) Filed: Jul. 5, 2017

(51) Int. Cl.
*H02J 9/00* (2006.01)
*H02J 9/06* (2006.01)
*H02S 40/32* (2014.01)
*H02J 3/38* (2006.01)
*H02J 3/46* (2006.01)

(52) U.S. Cl.
CPC .............. *H02J 9/062* (2013.01); *H02J 3/383* (2013.01); *H02J 3/46* (2013.01); *H02S 40/32* (2014.12)

(58) Field of Classification Search
CPC .... H02J 9/062; H02J 9/061; H02J 9/06; H02J 9/08; H01H 2300/018
USPC .......................................................... 307/64
See application file for complete search history.

(56) References Cited

U.S. PATENT DOCUMENTS

| | | | |
|---|---|---|---|
| 8,630,077 B2 | 1/2014 | Johnston et al. | |
| 9,780,253 B2 | 10/2017 | Morad et al. | |
| 2015/0171628 A1 | 6/2015 | Ponec et al. | |
| 2015/0349709 A1 | 12/2015 | Ponec et al. | |
| 2016/0118934 A1 | 4/2016 | Johnson et al. | |
| 2016/0126367 A1* | 5/2016 | Dunton | H01L 31/02021 307/115 |
| 2017/0207620 A1* | 7/2017 | Zhu | H02S 40/32 |
| 2018/0083450 A1 | 3/2018 | Truong et al. | |
| 2018/0248359 A1* | 8/2018 | Zou | H01L 31/0443 |

FOREIGN PATENT DOCUMENTS

WO 2015/183827 A2 12/2015

\* cited by examiner

*Primary Examiner* — Anh Q Tra
(74) *Attorney, Agent, or Firm* — Okamoto & Benedicto LLP

(57) ABSTRACT

A photovoltaic system includes groups of solar cells that can be switched in and out of the photovoltaic system. In response to detecting initiation of rapid shutdown, a control circuit controls a switch device to switch out a group of solar cells to lower the output voltage of the photovoltaic system below a safety level. In response to detecting a release trigger that indicates resumption of normal operation, the control circuit controls the switch device to switch back the group of solar cells to restore the output voltage of the photovoltaic system to a normal operating level. Solar cells may be switched out by disconnecting them from the photovoltaic system and switched back by reconnecting them into the photovoltaic system. Solar cells may also be switched out by shorting them out of the photovoltaic system and switched back in by removing the short.

20 Claims, 20 Drawing Sheets

RAPID SHUTDOWN OF PHOTOVOLTAIC SYSTEMS

TECHNICAL FIELD

Embodiments of the subject matter described herein relate generally to solar cells. More particularly, embodiments of the subject matter relate to rapid shutdown of photovoltaic systems.

BACKGROUND

Solar cells are well known devices for converting solar radiation to electrical energy. A solar cell has a front side that faces the sun during normal operation to collect solar radiation and a backside opposite the front side. Solar radiation impinging on the solar cell creates electrical charges that may be harnessed to power an external electrical circuit, such as a load.

A photovoltaic panel, which is also referred to as a photovoltaic module, comprises a string of solar cells that are packaged together on a common support structure, such as a frame. A photovoltaic system may comprise one or more photovoltaic panels that form an array of solar cells. Photovoltaic systems may be installed in a residential housing, commercial building, or power plant as a green energy source. Because a photovoltaic panel generates power as long as its solar cells receive solar radiation, the photovoltaic panel's output voltage may pose a hazard to firefighters or other personnel who may have to be near the photovoltaic panel in the event of an emergency. The 2017 National Electric Code (NEC) Section 690.12 introduces a requirement for rooftop photovoltaic systems to limit controlled conductors to 80V or less within the array boundary and to 30V or less outside of the array boundary within 30 seconds of initiation of a rapid shutdown of the photovoltaic system.

BRIEF SUMMARY

In one embodiment, a photovoltaic system includes groups of solar cells that can be switched out of the photovoltaic system and switched back into the photovoltaic system. In response to detecting initiation of rapid shutdown of the photovoltaic system, a control circuit controls a switch device to switch out a group of solar cells to lower the output voltage of the photovoltaic system below a safety level. In response to detecting a release trigger that indicates resumption of normal operation, the control circuit controls the switch device to switch back the group of solar cells to restore the output voltage of the photovoltaic system to a normal operating level. Solar cells may be switched out by disconnecting them from the photovoltaic system and switched back in by reconnecting them back into the photovoltaic system. Solar cells may also be switched out by shorting them out of the photovoltaic system and switched back in by removing the short.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

Figure 1:
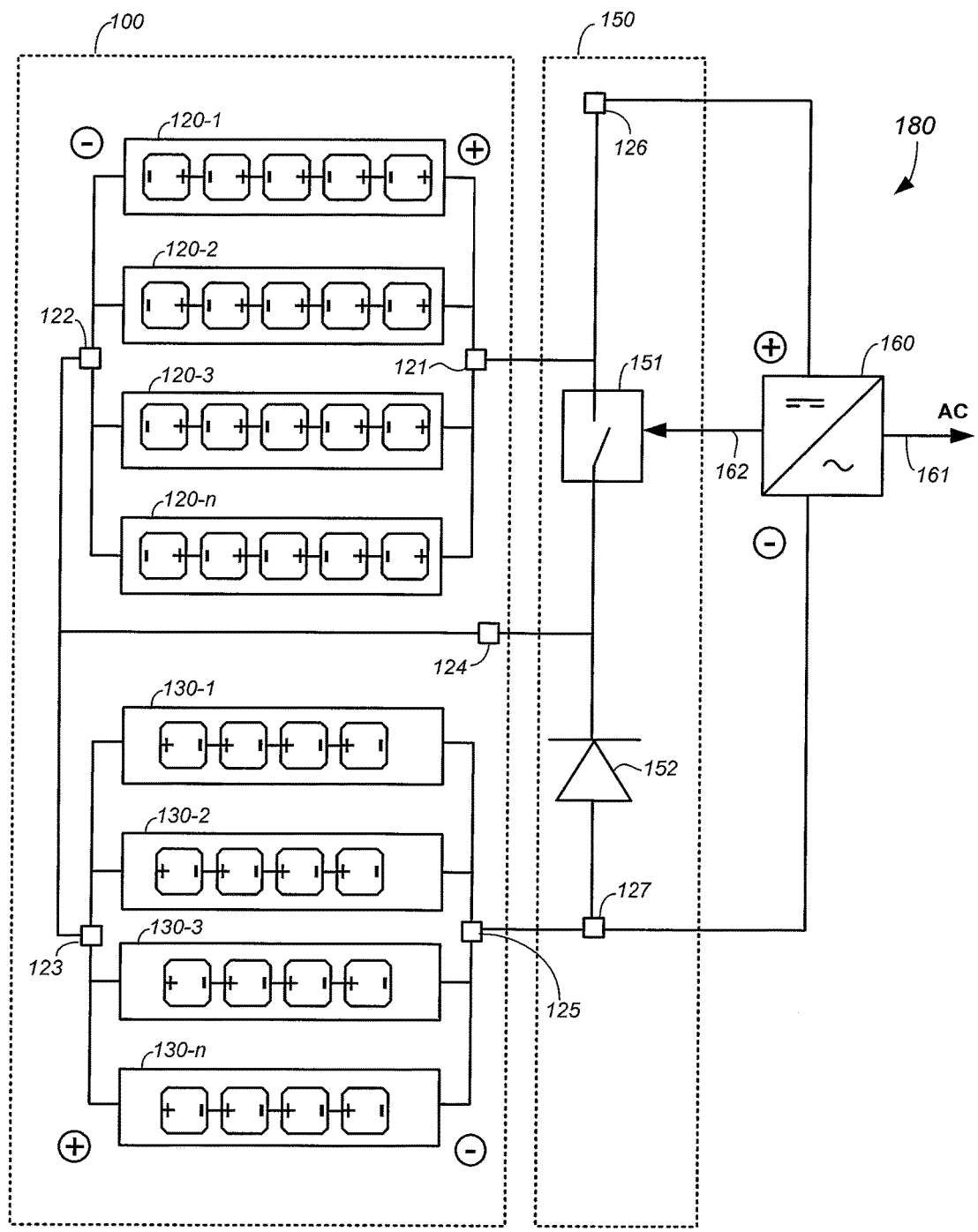
FIG. 1 shows a schematic diagram of a photovoltaic system in accordance with an embodiment of the present invention.

FIG. 1 shows a schematic diagram of a photovoltaic system 180 in accordance with an embodiment of the present invention. In the example of FIG. 1, the photovoltaic system 180 comprises a photovoltaic panel 100, a rapid shutdown control circuit ("control circuit") 150, and a photovoltaic inverter 160. The photovoltaic system 180 may have a plurality of photovoltaic panels and inverters, but only one of each is shown in FIG. 1 for clarity of illustration.

The control circuit 150 may be integrated in the photovoltaic panel 100 and receive power from one or more solar cells of the photovoltaic panel 100.

In the example of FIG. 1, the photovoltaic panel 100 comprises a plurality of solar cells 120 (i.e., 120-1, 120-2, 120-3, ..., 120-n) and 130 (i.e., 130-1, 130-2, 130-3, ..., 130-n). In general, the number of solar cells that a photovoltaic panel may have will depend on the particulars of the application. In one embodiment, a solar cell 120 or 130 is a hyper cell, such as those commercially-available from the SunPower™ Corporation. Generally speaking, a hyper cell comprises a plurality of serially-connected solar cells. Hyper cells may be incorporated in P-series photovoltaic panels, which are commercially-available from the SunPower™ Corporation. Hyper cells and P-series photovoltaic panels are disclosed in commonly-assigned PCT Application No. PCT/US2015/032472, which is published as PCT publication No. WO2015183827A2, incorporated herein by reference in its entirety. It is to be noted that embodiments of the present invention are not limited to hyper cells and P-series photovoltaic panels. Embodiments of the present invention are applicable to other photovoltaic panel and solar cell designs.

In the example of FIG. 1, the solar cells 120 form a first group (or sub-circuit) of parallel-connected solar cells across the nodes 122 and 121. The positive end of the first group of solar cells is connected to the node 121 and the negative end of the first group of solar cells is connected to the node 122. The solar cells 130 form a second group of parallel-connected solar cells across the nodes 123 and 125. The positive end of the second group of solar cells is connected to the node 123 and the negative end of the second group of solar cells is connected to the node 125. In one embodiment, the number of solar cells 120 is the same as the number of solar cells 130. However, the number of series-connected solar cells in a solar cell 120 is larger than the number of series-connected solar cells in a solar cell 130. The number of solar cells in a solar cell 130 is such that the contribution of the solar cells 130 to the panel voltage during safety shutdown mode is below a safety level that complies with the 2017 NEC Section 690.12 or other safety requirement.

In the example of FIG. 1, the first group of solar cells is serially connected to the second group of solar cells by connecting the node 122 to the node 123. The positive end of the photovoltaic panel 100 at the node 121 is connected to the positive end of the photovoltaic inverter 160, and the negative end of the photovoltaic panel 100 at the node 125 is connected to the negative end of the photovoltaic inverter 160.

Generally speaking, the output voltage of a photovoltaic panel is referred to as the panel voltage and the output current of a photovoltaic panel is referred to as the panel current. The output voltage of a photovoltaic system is referred to as the system voltage, which is the sum of the voltage contributions of the photovoltaic panels. Similarly, the output current of the photovoltaic system is referred to as the system current. In the example of FIG. 1, with one photovoltaic panel 100, the panel voltage and panel current are the output voltage and output current, respectively, of the photovoltaic system 180.

In one embodiment, an initiation event that indicates rapid shutdown of the photovoltaic system 180 is triggered when the output current of the photovoltaic system 180 drops down to zero. In one embodiment, shutting down the photovoltaic inverter 160 is an initiation event that initiates rapid shutdown of the photovoltaic system 180.

The photovoltaic inverter 160 is configured to convert the direct current (DC) output of solar cells to alternating current (AC) output (FIG. 1, 161). In the example of FIG. 1, the photovoltaic panel 100 is connected to the photovoltaic inverter 160 through the control circuit 150. More particularly, the node 121 is connected to a node 126, which is connected to the positive end of the photovoltaic inverter 160. Similarly, the node 125 is connected to a node 127, which is connected to the negative end of the photovoltaic inverter 160. When the photovoltaic inverter 160 is shutdown (e.g., powered off or disconnected due to an emergency or maintenance), the connection to the photovoltaic inverter 160 causes the panel current to drop to zero.

In the example of FIG. 1, the control circuit 150 comprises a switch 151 and a bypass diode 152. The bypass diode 152 has an anode that is connected to the node 125 and a cathode that is connected to the node 124. One end of the switch 151 is connected to the node 124, and the opposing end of the switch 151 is connected to the node 121. During normal operation, the switch 151 is open and the bypass diode 152 is reverse biased. Accordingly, the panel current flows from the node 127, to the node 125, to the node 123, to the node 122, to the node 121, and to the node 126. Closing the switch 151 creates a low resistance path through the node 124, the switch 151, and the node 126, thereby switching out the solar cells 120 across the nodes 121 and 122. That is, in the example of FIG. 1, the solar cells 120 are switched out by creating an electrical short ("short") across the nodes 121 and 122. The solar cells 120, having been switched out, no longer contribute to the panel voltage, thereby lowering the panel voltage and thus the system voltage. Opening the switch 151 removes the short to switch the solar cells 120 back into the photovoltaic system 180.

In one embodiment, the control circuit 150 is configured to detect an initiation event that is indicative of rapid shutdown, to place the photovoltaic panel 100 in safety shutdown mode by lowering the panel voltage of the photovoltaic panel 100 below a safety level, to remain operational while the photovoltaic panel 100 is in the safety shutdown mode, to wait for a release trigger from the photovoltaic inverter 160, and, in response to receiving the release trigger, to place the photovoltaic panel 100 back in normal operation mode by restoring the panel voltage of the photovoltaic panel 100 to its normal operating level.

In one embodiment, the control circuit 150 is configured to lower the panel voltage of the photovoltaic panel 100 below the safety level by switching out the solar cells 120, and to restore the panel voltage of the photovoltaic panel 100 back to the normal operating level by switching back the solar cells 120. In one embodiment, the control circuit 150 is configured to detect an initiation of rapid shutdown by detecting for zero panel current for a predetermined amount of time (e.g., longer than a threshold time). As noted, the switch 151 is open during normal operation mode. In response to detecting the initiation event, the control circuit 150 closes the switch 151 to switch out the solar cells 120 and remove their voltage contribution to the panel voltage, thereby lowering the panel voltage below the safety level. While the solar cells 120 are switched out, the solar cells 130 continue to generate output power for the control circuit 150 to allow the control circuit 150 to remain operational and wait for the release trigger. Powering the control circuit 150 using the solar cells 130 during safety shutdown mode advantageously simplifies resumption of the photovoltaic panel 100 to normal operation. The solar cells 130 and other solar cells that are configured to remain operational during safety shutdown mode, e.g., to provide power to a rapid shutdown control circuit or other circuits, are also referred to as supply cells.

The photovoltaic inverter 160 may send the release trigger to the control circuit 150 by sending a trigger signal (e.g., ripple voltage, reverse current) on the line connecting the panel voltage to the photovoltaic inverter 160 or by sending a control signal on a dedicated connection 162 (e.g., wired or wireless connection) to the control circuit 150. In response to detecting the release trigger signal, the control circuit 150 opens the switch 151 to switch back the solar cells 120 and raise the panel voltage back to its normal operating level.

As a particular example, the photovoltaic panel 100 may generate a panel voltage of 42.8 V when the solar cells 120 and 130 are both connected. By switching out the solar cells 120 during safety shutdown mode, the solar cells 130 may continue to generate a panel voltage of 1.25V or other suitable panel voltage. In that case, the panel voltage during safety shutdown mode is relatively low but is sufficient to keep the control circuit 150 operational. The number of solar cells to switch out and to keep in the string during safety shutdown mode depends on the voltage outputs of the solar cells and the target safety level.

Figure 2:
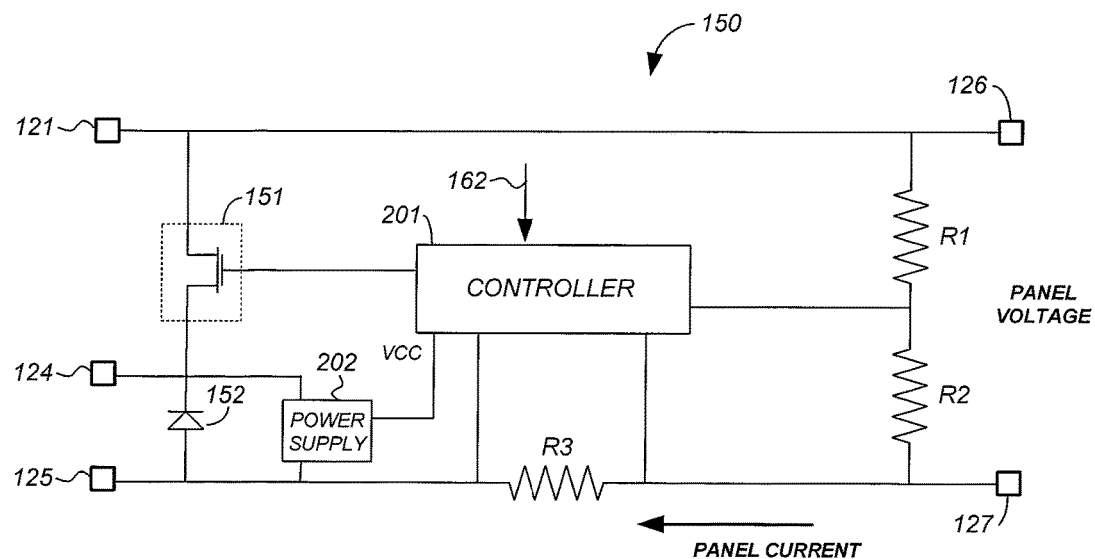
FIG. 2 shows a schematic diagram of a control circuit in accordance with an embodiment of the present invention.

FIG. 2 shows a schematic diagram of the control circuit 150 in accordance with an embodiment of the present invention. In the example of FIG. 2, the nodes 121 and 124-127 are connected as shown in FIG. 1. More particularly, the control circuit 150 is connected to the panel output power (i.e., panel voltage and panel current) by connecting to the nodes 121 and 125. The cathode of the bypass diode 152 is connected to the node 124 and the anode of the bypass diode 152 is connected to the node 125. In the example of FIG. 2, the switch 151 is a field effect transistor (FET). The switch 151 may also be another type of transistor (e.g., bipolar junction transistor, MOSFET) or another switch device. In the example of FIG. 2, one terminal of the switch 151 (e.g., drain terminal) is connected to the node 121 and the other terminal of the switch 151 (e.g., source terminal) is connected to the node 124. The control terminal of the switch 151 (e.g., gate terminal) is connected to a controller 201.

In one embodiment, the controller 201 comprises a microcontroller with integrated data acquisition (e.g., analog to digital converter) and control (e.g., analog and digital input/output) circuits. The controller 201 may include firmware for implementing a state machine and other programmed logic. The controller 201 may also comprise discrete circuits.

A power supply 202 provides the supply voltage Vcc to the controller 201. The power supply 202 may comprise a DC-DC converter that receives input power from the solar cells 130 across the nodes 124 and 125. Using the solar cells 130 to provide input power to the power supply 202 advantageously allows the control circuit 150 to be operated by solar energy and simplifies maintenance of the photovoltaic panel 100. In the example of FIG. 2, the power supply 202 receives the input power from the solar cells 130, which remain (i.e., not switched out) in the string when the photovoltaic panel 100 is in safety shutdown mode. More particularly, the power supply 202 continues to receive input power from the solar cells 130, thereby providing supply voltage to the controller 201 even during the safety shutdown mode. This advantageously allows the control circuit 150 to remain operational during the safety shutdown mode.

In one embodiment, the control circuit 150 monitors the panel voltage by way of a voltage sense circuit comprising the resistors R1 and R2, and monitors the panel current by way of a current sense circuit comprising the resistor R3. More particularly, in the example of FIG. 2, the resistors R1 and R2 form a voltage divider that scales the panel voltage across the nodes 126 and 127. The controller 201 senses the voltage across the resistor R2 to monitor the panel voltage. In one embodiment, the controller 201 detects a release trigger signal by monitoring the panel voltage for a superimposed or added predetermined release trigger signal. For example, the release trigger signal may be a controlled ripple voltage or reverse current that is generated by the photovoltaic inverter 160 to indicate resumption of normal operation. The photovoltaic inverter 160 may also transmit the release trigger signal to the controller 201 over a dedicated connection 162.

In the example of FIG. 2, the panel current develops a current sense voltage across the resistor R3. The controller 201 senses the current sense voltage across the resistor R3 to monitor the panel current. In one embodiment, the control circuit 201 detects initiation of rapid shutdown by monitoring for zero panel current for a predetermined period of time. For example, the control circuit 150 may enter safety shutdown mode when the panel current is zero for longer than five seconds, which indicates that the photovoltaic inverter 160 has been shut down.

In the example of FIG. 2, the controller 201 drives the control terminal of the switch 151. In one embodiment, the controller 201 closes the switch 151 when the controller 201 detects the initiation event indicative of rapid shutdown, and opens the switch 151 when the controller 201 detects the release trigger signal.

Figure 3:
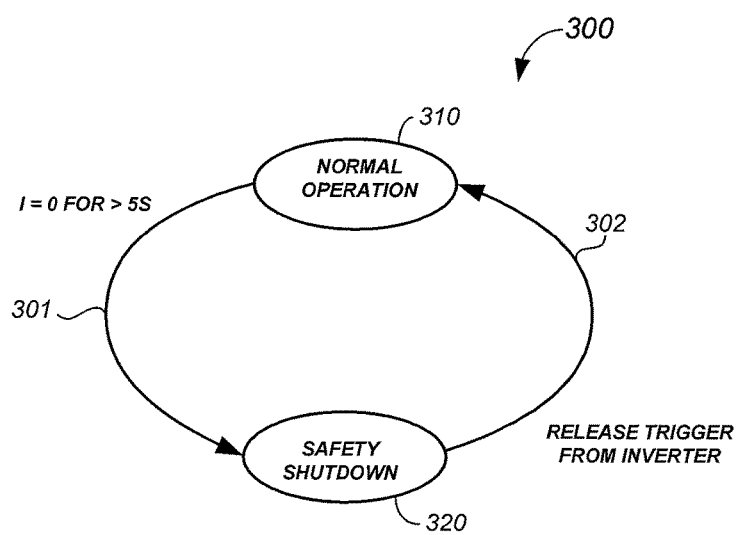
FIG. 3 shows a state diagram of operating a photovoltaic system with safety shutdown in accordance with an embodiment of the present invention.

FIG. 3 shows a state diagram 300 of operating a photovoltaic system in accordance with an embodiment of the present invention. In one embodiment, the state diagram 300 is implemented by the control circuit 150.

In the example of FIG. 3, upon start up, the photovoltaic system 180 is in normal operation mode (state 310). During normal operation mode, the control circuit 150 opens the switch 151 to allow voltage contributions from the solar cells 120 and 130 of the photovoltaic panel 100 (see FIG. 1) to be available as the panel voltage that is input to the photovoltaic inverter 160. In one embodiment, rapid shutdown of the photovoltaic system 180 is initiated when the photovoltaic inverter 160 is shutdown, thereby dropping the panel current to zero. The control circuit 150 detects the initiation of rapid shutdown when the panel current is zero for longer than a threshold time (e.g., five seconds). The control circuit 150 transitions 301 from normal operation mode (state 310) to safety shutdown mode (state 320) in response to detecting the initiation event by closing the switch 151 to lower the panel voltage below a safety level (e.g., below 80V for within the array boundary). The photovoltaic inverter 160 may be configured to generate the release trigger signal when the photovoltaic inverter 160 is powered back up to resume normal operation. The control circuit 150 transitions 302 from safety shutdown mode to normal operation mode in response to detecting the release trigger signal.

Figure 4:
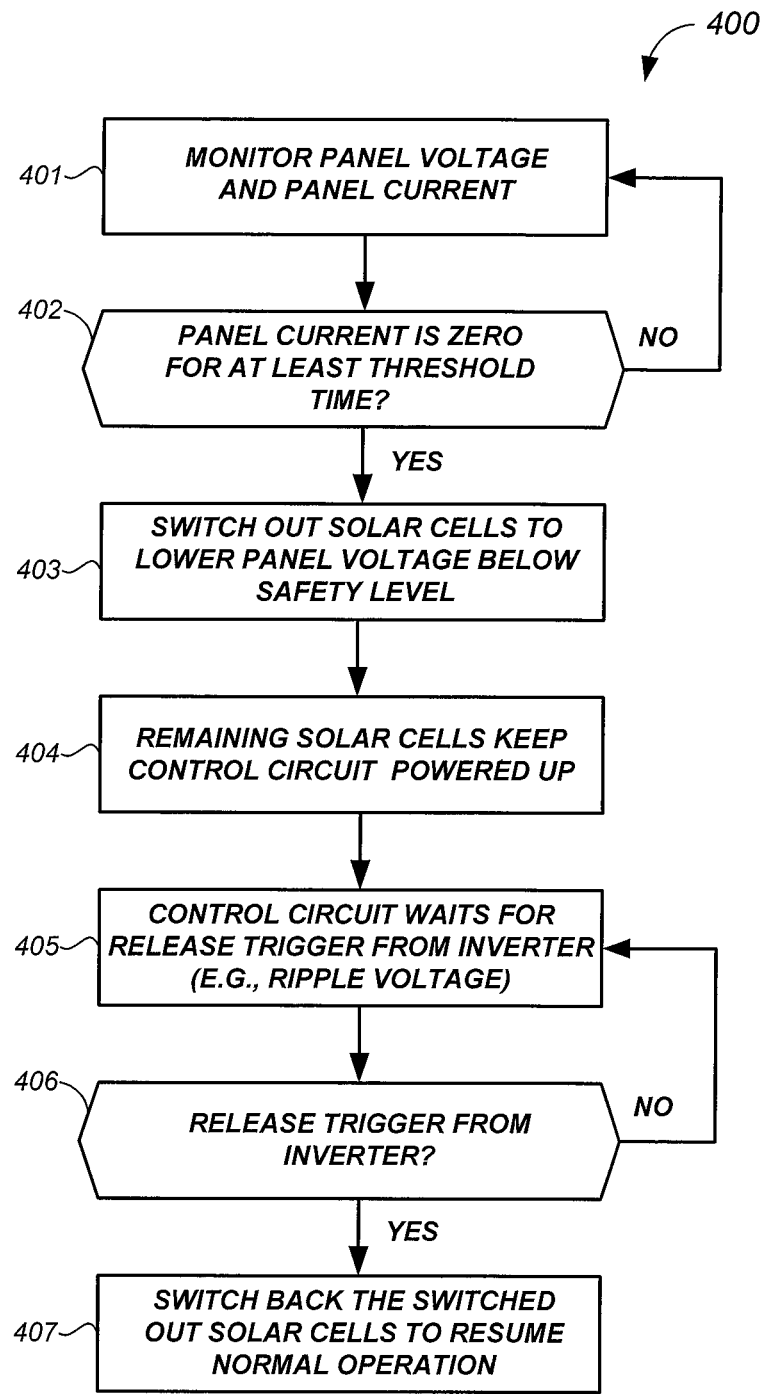
FIG. 4 shows a flow diagram of a method of operating a photovoltaic system with safety shutdown in accordance with an embodiment of the present invention.

FIG. 4 shows a flow diagram of a method 400 of operating a photovoltaic system with safety shutdown in accordance with an embodiment of the present invention. The method 400 may be performed by the control circuit 150. As can be appreciated, the method 400 may also be implemented using other rapid shutdown control circuits or suitable components without detracting from the merits of the present invention.

In the example of FIG. 4, the control circuit 150 monitors the panel current and panel voltage of the photovoltaic panel 100 (step 401). When the control circuit 150 detects that the panel current dropped to zero and stays at zero for at least a threshold length of time, indicating initiation of rapid shutdown, the control circuit 150 switches out the solar cells 120 to lower the panel voltage (step 402 to step 403). Otherwise, when the panel current does not drop to zero for at least the threshold period of time, the control circuit 150 continues monitoring the panel current and panel voltage to detect initiation of rapid shutdown (step 402 to step 401).

Switching out the solar cells 120 lowers the panel voltage below a target safety level (step 403). The target safety level depends on the safety requirement, and may be 80V for within the array boundary or 30V for outside of the array boundary in the case of the NEC Section 690.12. In one embodiment, the solar cells 130 serve as supply cells and are not switched out to continue to provide power to the control circuit 150 (step 404).

After switching out the solar cells 120 in response to detecting initiation of rapid shutdown, the control circuit 150 waits for a release trigger signal from the photovoltaic converter 160 (step 405). In response to detecting the release trigger signal, indicating resumption of normal operation, the control circuit 150 restores the panel voltage to its normal operating level by switching back the solar cells 120 (step 406 to step 407). Otherwise, the control circuit 150 continues to wait for the release trigger signal (step 406 to step 405).

Embodiments of the present invention may be implemented by switching out some but not all solar cells of a photovoltaic panel or by switching out an entire photovoltaic panel, i.e., all of the solar cells of the photovoltaic panel. Switching out some but not all photovoltaic panels of a photovoltaic system will lower the output voltage of the photovoltaic system. Solar cells may be switched out by shorting the solar cells out of the photovoltaic system, and may be switched back by removing the short as in the photovoltaic system 180 of FIG. 1. Solar cells may also be switched out by disconnecting the solar cells from the circuit of the photovoltaic system.

Figure 5:
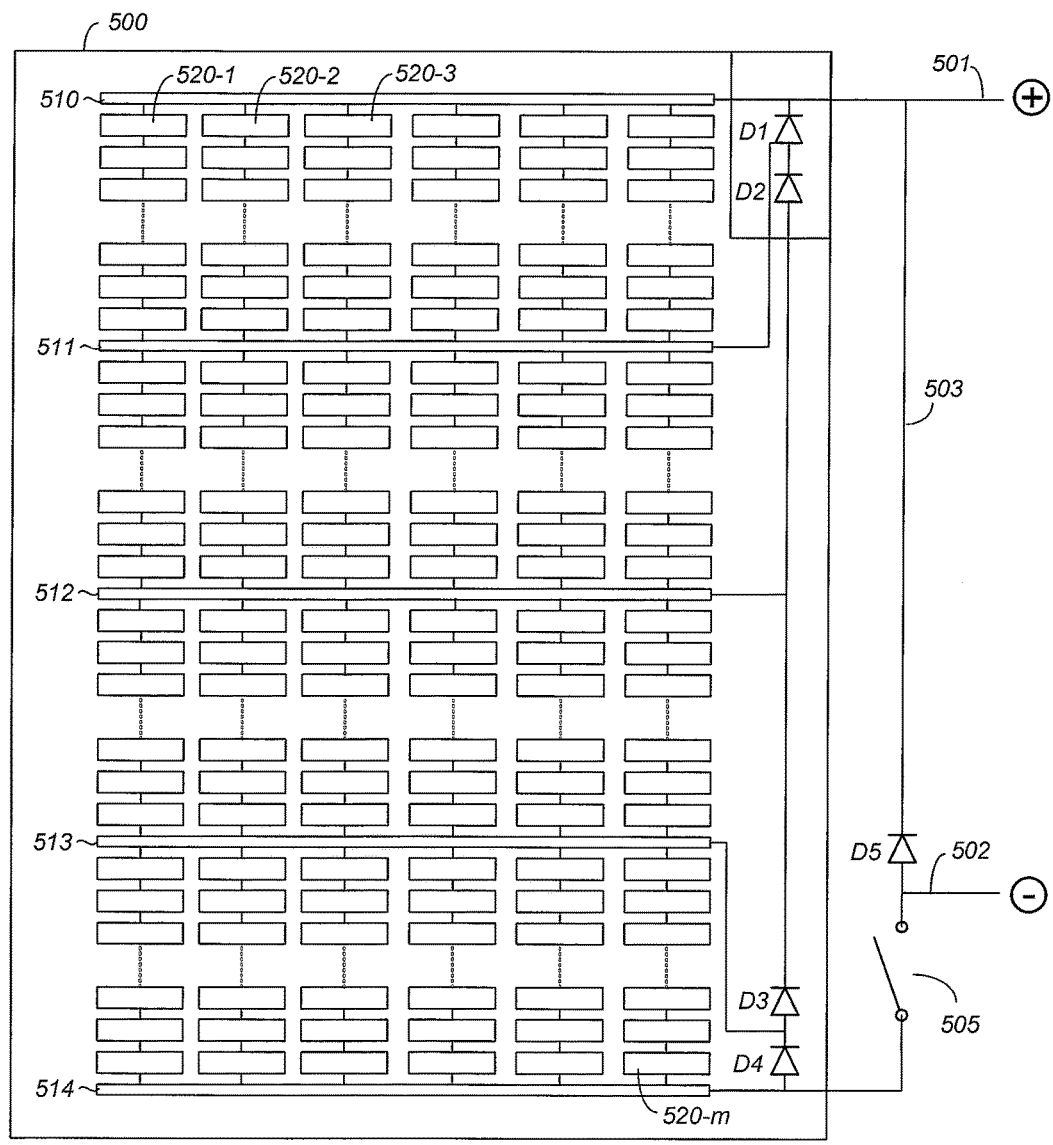
FIG. 5 shows a photovoltaic panel in accordance with an embodiment of the present invention.

FIG. 5 shows a photovoltaic panel 500 in accordance with an embodiment of the present invention. The photovoltaic panel 500 may be incorporated in a photovoltaic system to implement rapid shutdown. In the example of FIG. 5, the photovoltaic panel 500 may be switched out during safety shutdown mode by disconnecting the photovoltaic panel 500 from the photovoltaic system.

In the example of FIG. 5, the photovoltaic panel 500 comprises solar cells 520 (i.e., 520-1, 520-2, 520-3, . . . , 520-m). Only some of the solar cells 520 are labeled for clarity of illustration. In one embodiment, a solar cell 520 is a hyper cell, and the photovoltaic panel 500 is a P-series panel. Hyper cells and P series panels are commercially available from the SunPower™ Corporation. It is to be noted that embodiments of the present invention are not limited to hyper cells and P series panels.

In the example of FIG. 5, the photovoltaic panel 500 includes bus bars 510-514. The solar cells between the bus bars 510 and 511 form a first group of solar cells, the solar cells between the bus bars 511 and 512 form a second group of solar cells, etc. The diodes D1-D4 are bypass diodes for the groups of solar cells. More particularly, the first group of solar cells has the bypass diode D1, the second group of solar cells has the bypass diode D2, etc. The panel voltage of the photovoltaic panel 500 is available across a positive node 501 and a negative node 502 during normal operation.

In the example of FIG. 5, a switch 505 has a first end that is connected to the bus bar 514 and a second end that is connected to an anode of a bypass diode D5. A wire 503 connects a cathode of the diode D5 to the positive node 501. During normal operation, the switch 505 is closed, thereby providing the panel voltage of the photovoltaic panel 500 across the nodes 501 and 502. In response to detecting an initiation event that indicates rapid shutdown of the photovoltaic system, safety shutdown mode is entered by opening the switch 505 to disconnect the photovoltaic panel 500 from the photovoltaic system and thereby reduce the system voltage below the safety level. When the switch 505 is open, any reverse current will flow through the diode D5 so that the switch 505 does not have to block more than the panel voltage of the photovoltaic panel 500. In response to receiving a release trigger signal that indicates end of the safety shutdown mode, the switch 505 is closed to thereby reconnect the photovoltaic panel 500 back into the photovoltaic system.

Figure 6:
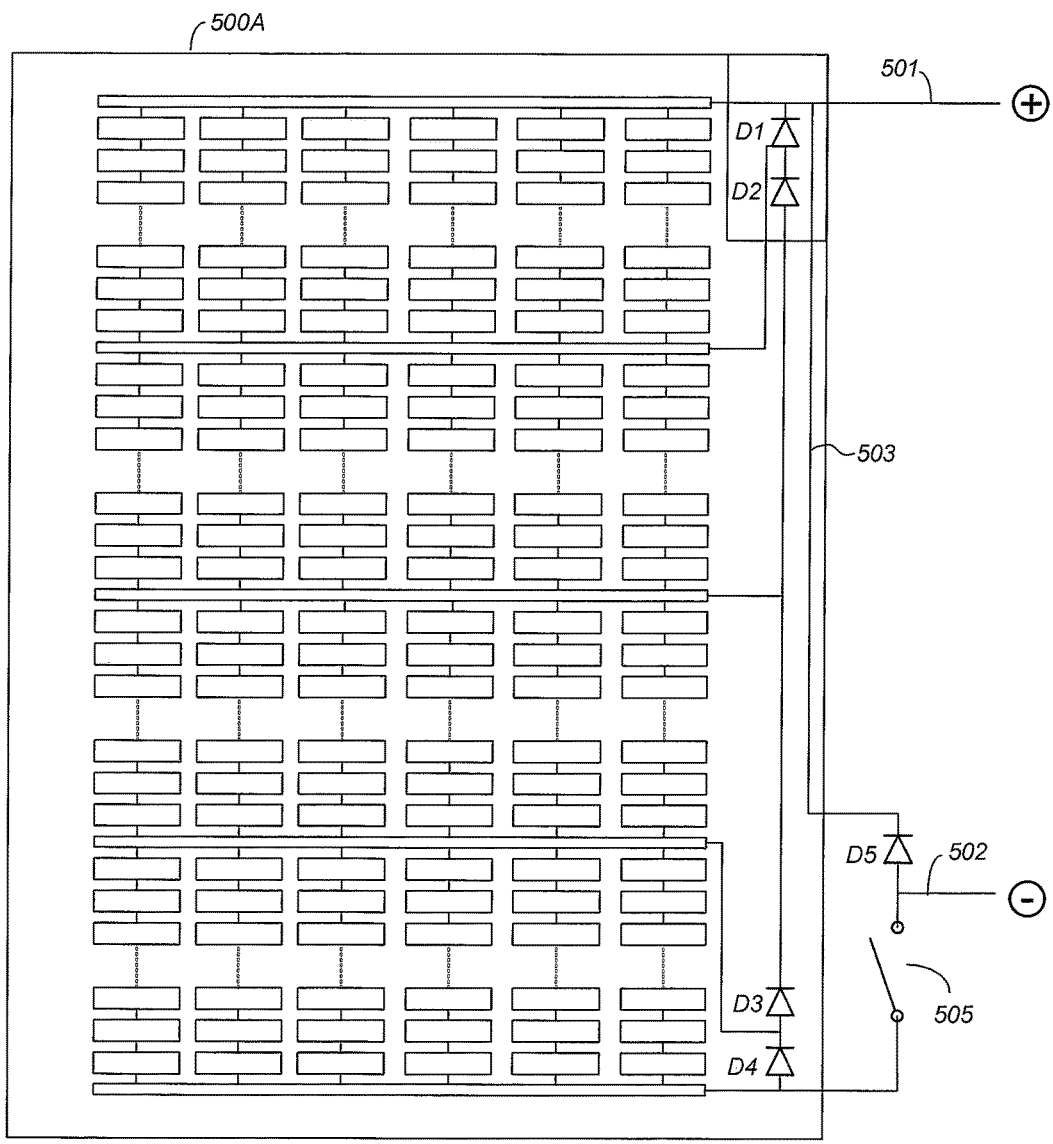
FIG. 6 shows a photovoltaic panel in accordance with another embodiment of the present invention.

FIG. 6 shows a photovoltaic panel 500A in accordance with an embodiment of the present invention. The photovoltaic panel 500A is a particular implementation of the photovoltaic panel 500 of FIG. 5. The photovoltaic panel 500A is the same as the photovoltaic panel 500 except that the wire 503 is integrated within the photovoltaic panel 500A for safety.

In the photovoltaic panels 500 and 500A, the number and placement of the diode D5 and the switch 505 may be varied depending on the implementation.

Figure 7:
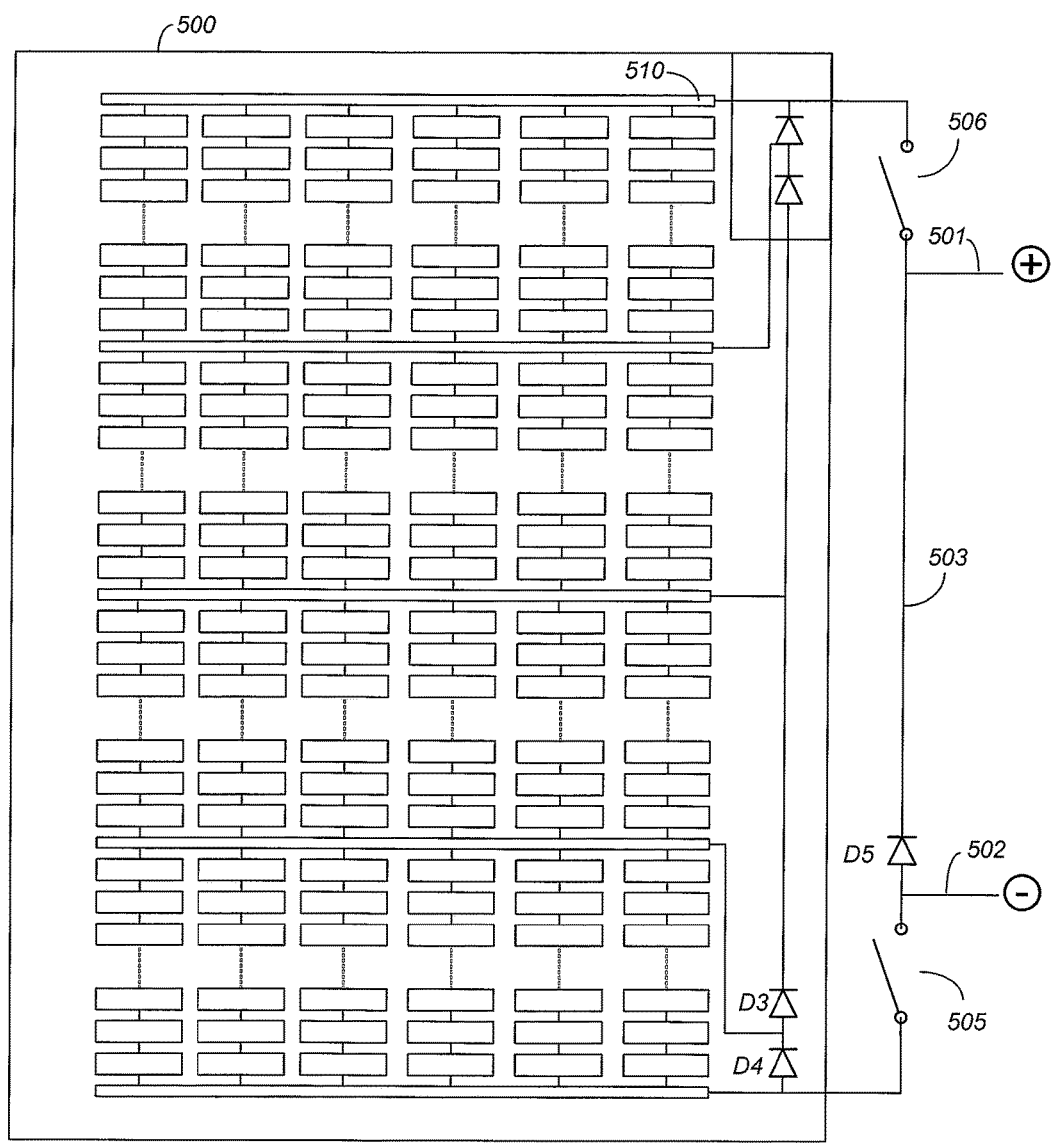
FIG. 7 shows the photovoltaic panel of FIG. 5 with an additional switch, in accordance with an embodiment of the present invention.

FIG. 7 shows the photovoltaic panel 500 of FIG. 5 with an additional switch 506 in accordance with an embodiment of the present invention. In the example of FIG. 7, the switches 506 and 505 are closed during normal operation to provide the panel voltage across the nodes 501 and 502. In response to detecting an initiation event, safety shutdown mode is entered by opening the switches 506 and 505 to disconnect the photovoltaic panel 500 from the photovoltaic system, and thereby remove the panel voltage contribution of the photovoltaic panel 500. In response to detecting a trigger release signal, the switches 506 and 505 are closed to reconnect the photovoltaic panel 500 back to the photovoltaic system to resume normal operation.

Figure 8:
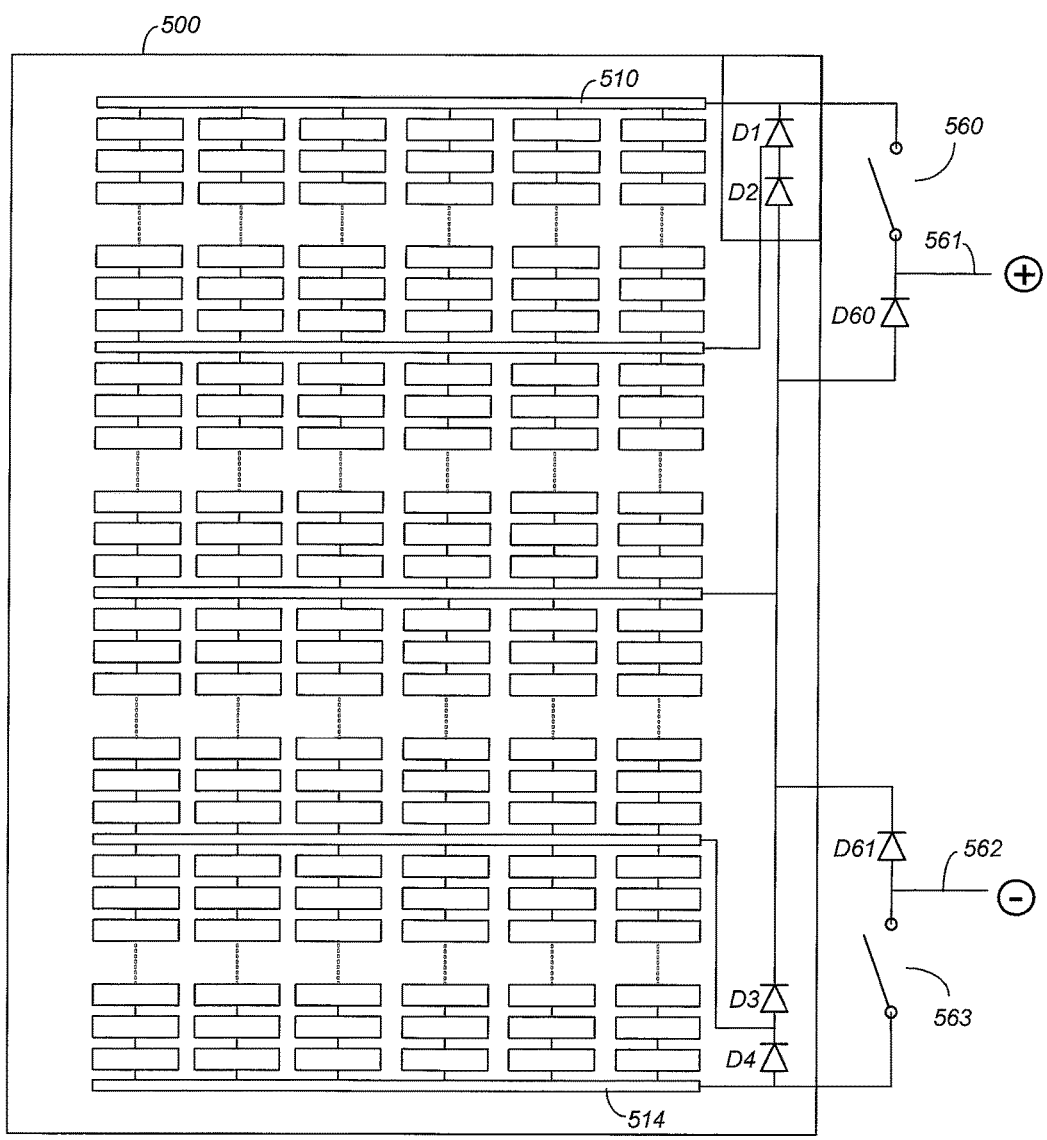
FIG. 8 shows the photovoltaic panel of FIG. 5 with two switches and two diodes in accordance with an embodiment of the present invention.

FIG. 8 shows the photovoltaic panel 500 of FIG. 5 with two switches and two diodes in accordance with an embodiment of the present invention. In the example of FIG. 8, the panel voltage of the photovoltaic panel 500 is across a positive node 561 and a negative node 562. In the example of FIG. 8, the switches 560 and 563 are closed during normal operation to provide the panel voltage across the nodes 561 and 562. In response to detecting an initiation event, safety shutdown mode is entered by opening the switches 561 and 562 to disconnect the photovoltaic panel 500 from the photovoltaic system, and thereby remove the panel voltage contribution of the photovoltaic panel 500. In response to detecting a trigger release signal, the switches 560 and 563 are closed to reconnect the photovoltaic panel 500 to the photovoltaic system to resume normal operation. Because the diodes D60 and D61 are in series and between the string, the switches 560 and 563 only need to block half the panel voltage.

Figure 9:
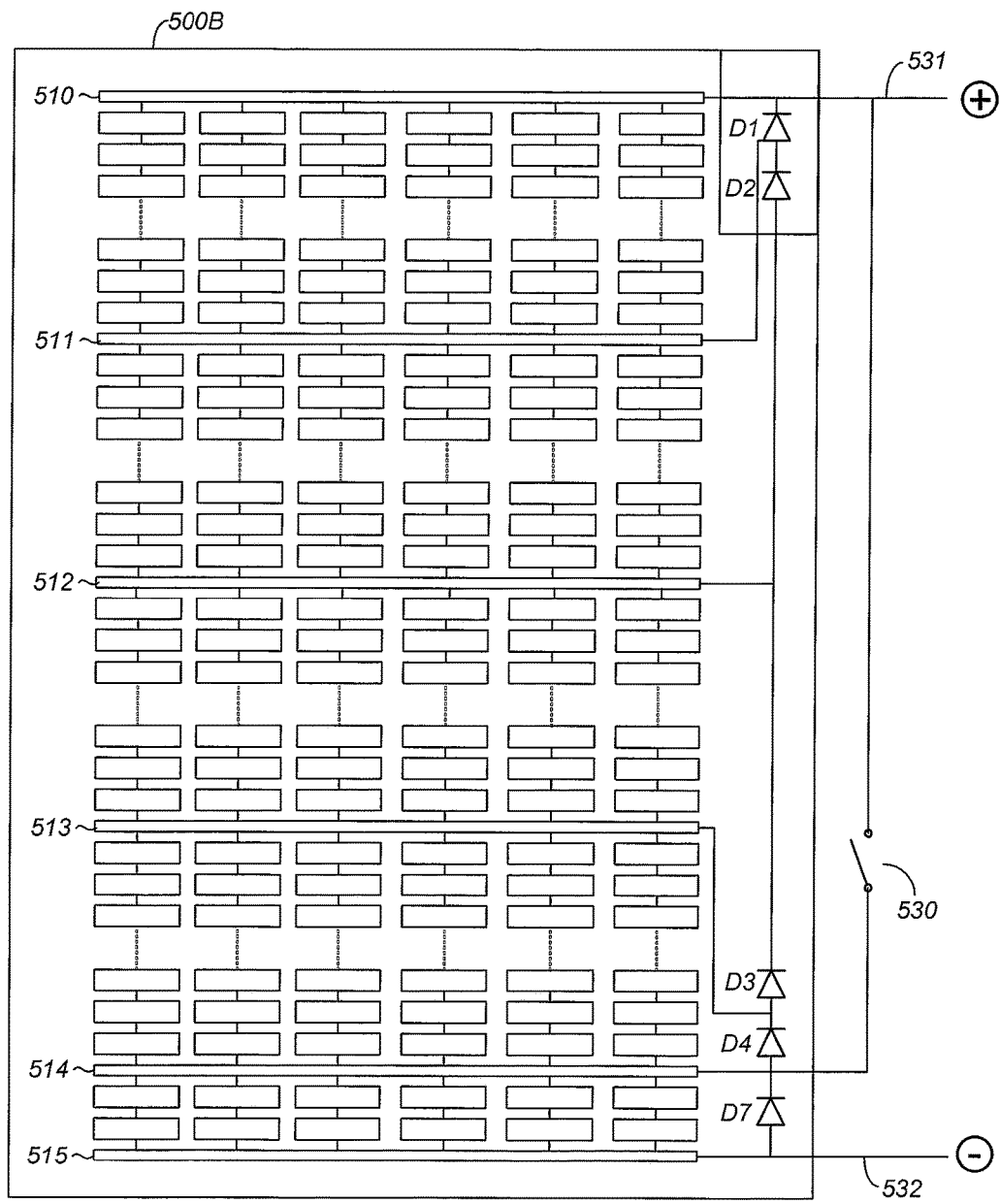
FIG. 9 shows a photovoltaic panel in accordance with another embodiment of the present invention.

FIG. 9 shows a photovoltaic panel 500B in accordance with an embodiment of the present invention. The photovoltaic panel 500B is a particular implementation of the photovoltaic panel 500 of FIG. 5. The photovoltaic panel 500B is the same as the photovoltaic panel 500 except for the addition of another group of solar cells that serve as supply cells between the bus bars 514 and 515. A diode D7 is across the supply cells. The bus bars 510-514 and diodes D1-D4 are otherwise the same as in the photovoltaic panel 500.

In the example of FIG. 9, the bus bar 510 is connected to the positive node 531 and the bus bar 515 is connected to the negative node 532. The switch 530 is open during normal operation to provide the panel voltage across the nodes 531 and 532. In response to detecting an initiation event, safety shutdown mode is entered by closing the switch 530 to short out the solar cells between the bus bars 510 and 514, thereby removing their contribution to the panel voltage. In the example of FIG. 9, the switch 530 shorts out the bulk of the solar cells of the photovoltaic panel 500B to limit the panel voltage so that system voltage is limited to below a safety level, such as below 80V or 30V. In some implementations, the panel voltage may be limited to approximately 5V to limit the system voltage to 80V, or to 2V to limit the system voltage to 30V. The solar cells between the bus bars 514 and 515, which serve as supply cells, are not shorted out to provide power to a corresponding rapid shutdown control circuit during safety shutdown mode. The diode D7 serves as a protective bypass diode in the event the solar cells between the bus bars 514 and 515 become shaded during normal operation.

Figure 10:
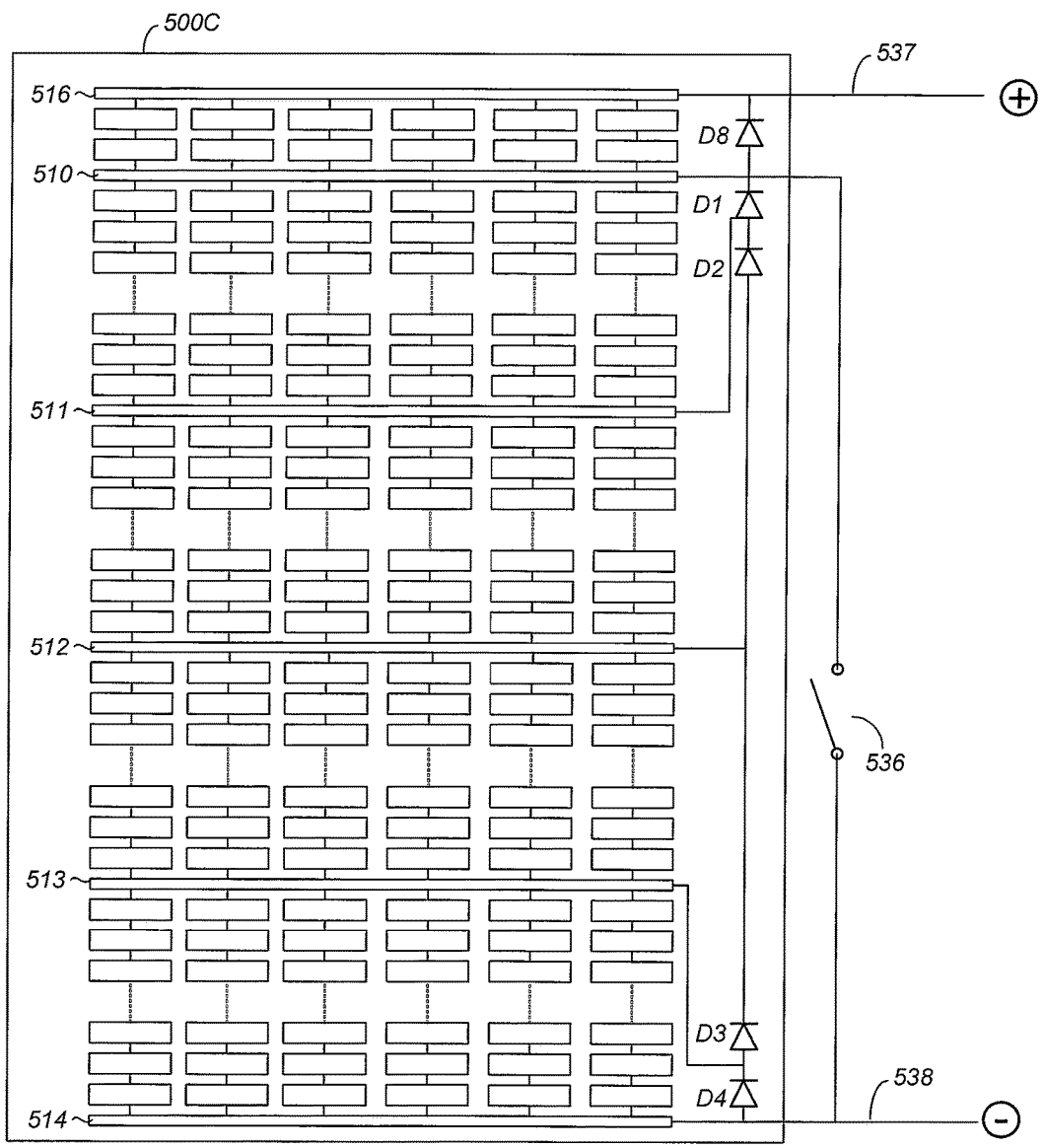
FIG. 10 shows a photovoltaic panel in accordance with another embodiment of the present invention.

FIG. 10 shows a photovoltaic panel 500C in accordance with an embodiment of the present invention. The photovoltaic panel 500C is a particular implementation of the photovoltaic panel 500 of FIG. 5. The photovoltaic panel 500C is the same as the photovoltaic panel 500B of FIG. 9 except that the supply cells are on the high side.

In the example of FIG. 10, the solar cells between the bus bars 516 and 510 serve as supply cells for providing supply voltage to a control circuit even when in safety shutdown mode. A diode D8 is across the solar cells between the bus bars 516 and 510. The bus bars 510-514 and diodes D1-D4 are otherwise the same as in the photovoltaic panel 500.

In the example of FIG. 10, the bus bar 516 is connected to the positive node 537 and the bus bar 514 is connected to the negative node 538. The switch 536 is open during normal operation to provide the panel voltage across the nodes 537 and 538. In response to detecting an initiation event, safety shutdown mode is entered by closing the switch 536 to short out the solar cells between the bus bars 510 and 514, thereby removing their contribution to the panel voltage. The solar cells between the bus bars 516 and 510 are not shorted in safety shutdown mode to provide power to a corresponding rapid shutdown control circuit. The diode D8 serves as a protective bypass diode in the event the solar cells between the bus bars 516 and 510 become shaded during normal operation.

Figure 11:
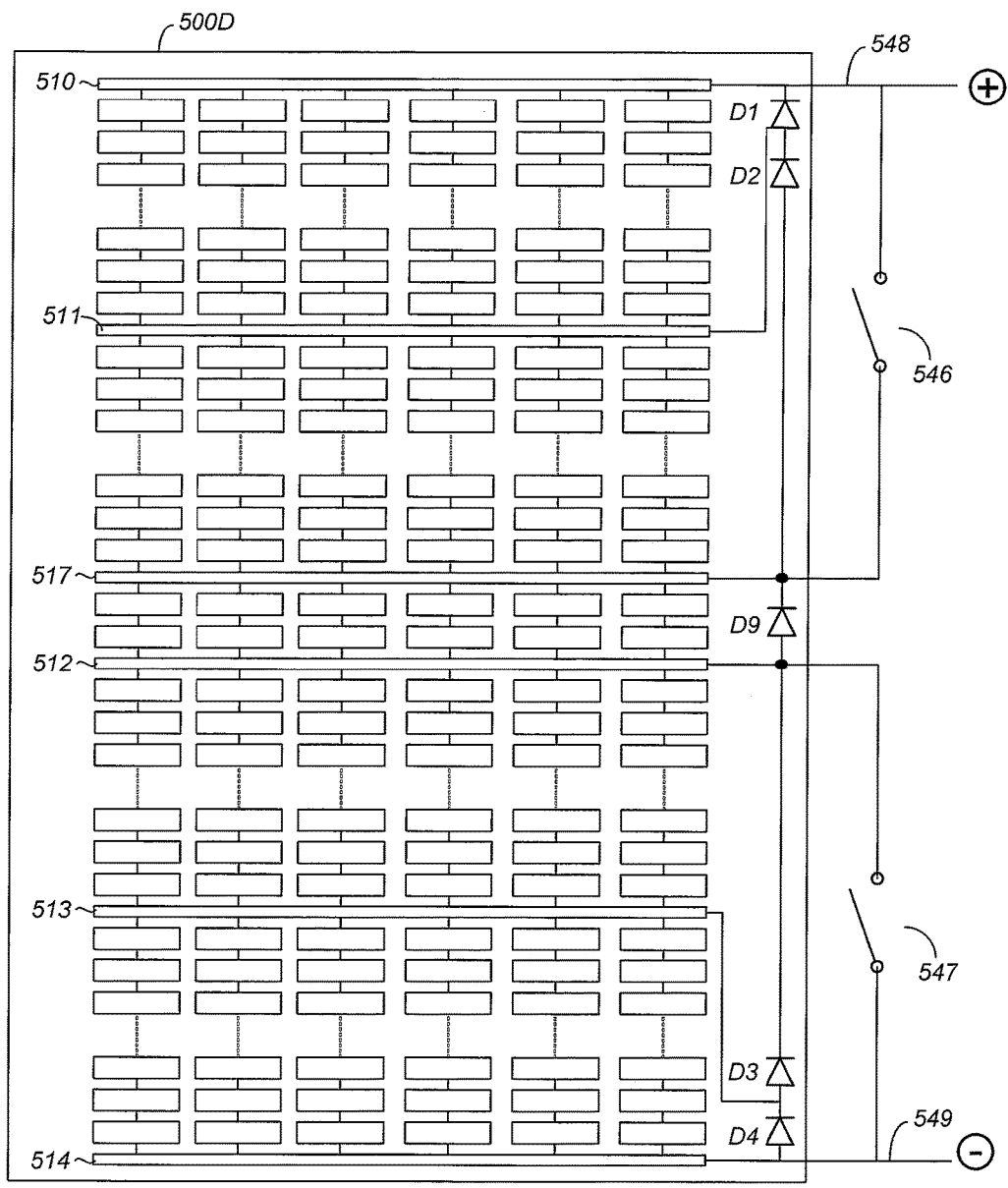
FIG. 11 shows a photovoltaic panel in accordance with another embodiment of the present invention.

FIG. 11 shows a photovoltaic panel 500D in accordance with an embodiment of the present invention. The photovoltaic panel 500D is a particular implementation of the photovoltaic panel 500 of FIG. 5. The photovoltaic panel 500D demonstrates that the supply cells may be placed in various locations within the photovoltaic panel and can be used with additional switches. In general, multiple sets of supply cells and different numbers of bypass diodes and switches may be employed depending on the application.

In the example of FIG. 11, a bus bar 517 is added between the bus bars 511 and 512 to accommodate supply cells between the bus bars 517 and 512. A diode D9 is connected across the supply cells between the bus bars 517 and 512. A cathode of the diode D9 is connected to an anode of the diode D2, and an anode of the diode D9 is connected to a cathode of the diode D3. The bus bars 510-514 and diodes D1-D4 are otherwise the same as in the photovoltaic panel 500 of FIG. 5.

In the example of FIG. 11, the bus bar 510 is connected to the positive node 548 and the bus bar 514 is connected to the negative node 549. The switches 546 and 547 are open during normal operation to provide the panel voltage across the nodes 548 and 549. In response to detecting an initiation event, safety shutdown mode is entered by closing the switches 546 and 547 to short out the solar cells between the bus bars 510 and 517 and between the bus bars 512 and 514, thereby removing their contribution to the panel voltage. The solar cells between the bus bars 517 and 512, which serve as supply cells, are not shorted in safety shutdown mode to provide power to a corresponding rapid shutdown control circuit. The diode D9 serves as a protective bypass diode in the event the solar cells between the bus bars 517 and 512 become shaded during normal operation.

Figure 12:
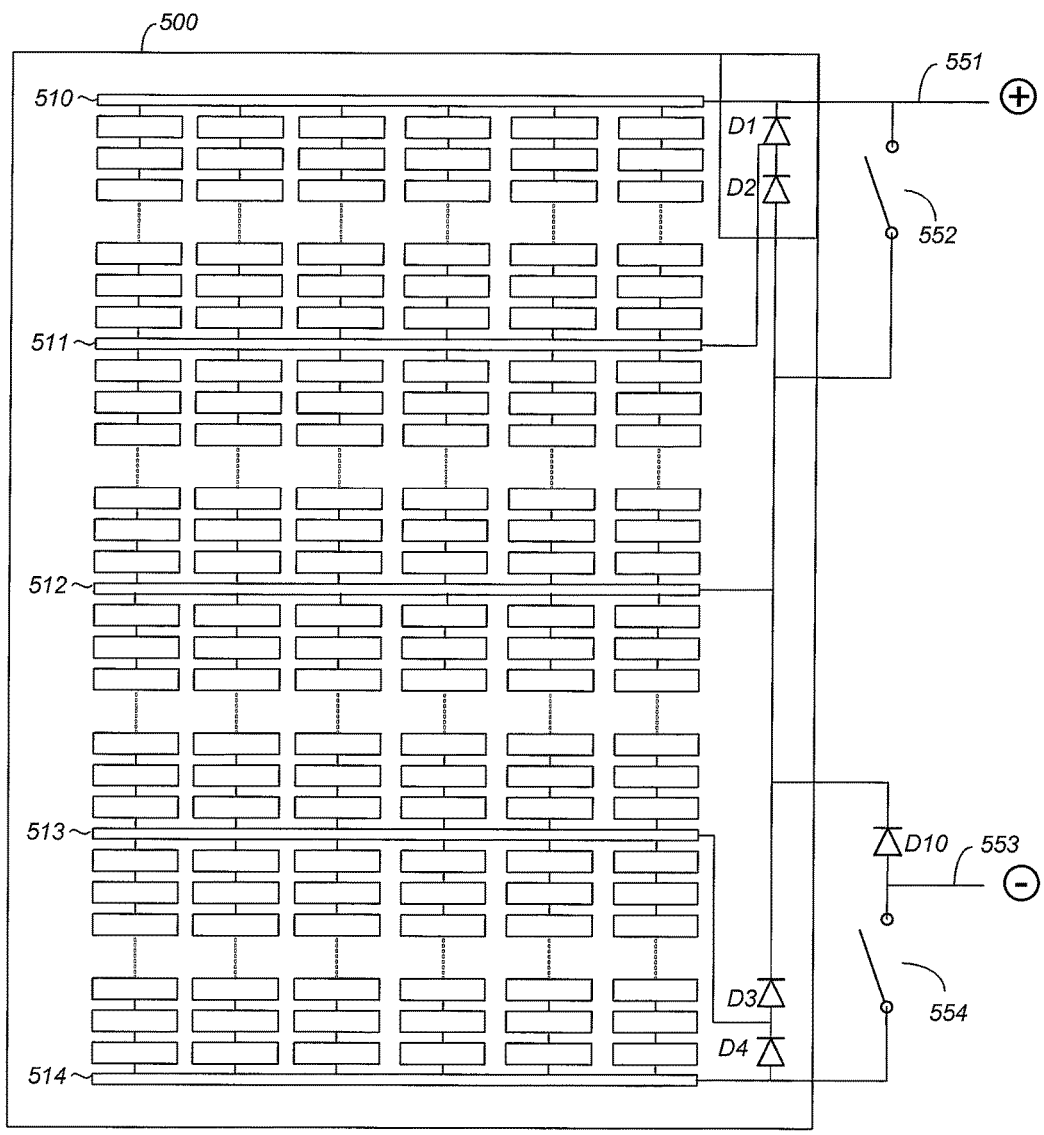
FIG. 12 shows the photovoltaic panel of FIG. 5 with solar cell disconnection and shorting in accordance with an embodiment of the present invention.

FIG. 12 shows the photovoltaic panel 500 with solar cell disconnection and shorting in accordance with an embodiment of the present invention. In the example of FIG. 12, the bus bar 510 is connected to the positive node 551. The connection of the bus bar 514 to the negative node 553 is controlled by a switch 554. During normal operation, the switch 554 is closed and the switch 552 is open, thereby providing the panel voltage across the nodes 551 and 553. In response to detecting an initiation event, safety shutdown mode is entered by opening the switch 554 and closing the switch 552. Opening the switch 554 disconnects the solar cells between the bus bars 512 and 514, thereby removing their contribution to the panel voltage. Closing the switch 552 shorts the solar cells between the bus bars 510 and 512, also removing their contribution to the panel voltage. Accordingly, in safety shutdown mode, all of the solar cells of the photovoltaic panel 500 are switched out of the photovoltaic system. When the switch 554 is open, any reverse current will flow through the diode D10 so that the switch 554 does not have to block more than the panel voltage of the photovoltaic panel 500. The solar cells between the bus bars 512 and 514 may be used as supply cells for powering a corresponding rapid shutdown control circuit during safety shutdown mode.

Figure 13:
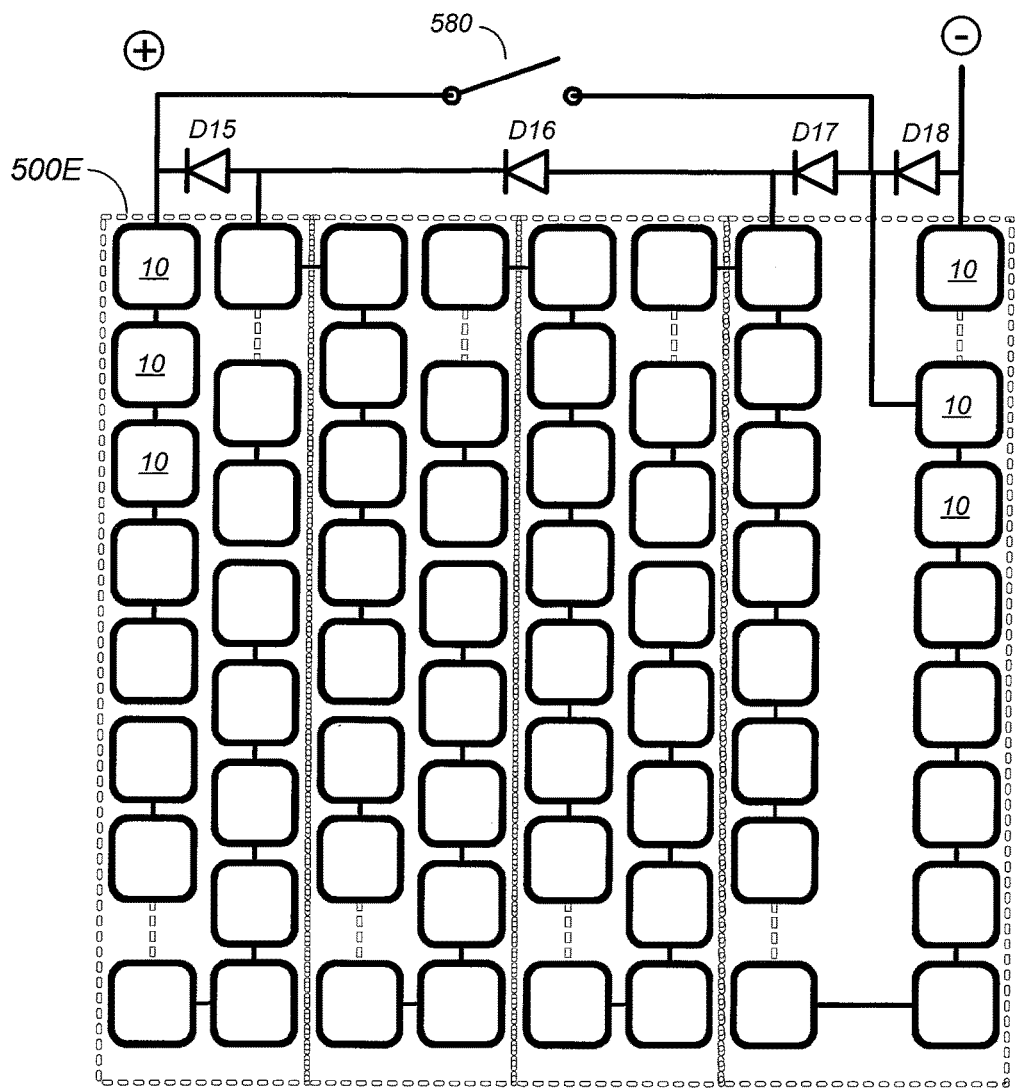
FIG. 13 shows a photovoltaic panel in accordance with another embodiment of the present invention.

As previously noted, embodiments of the present invention are generally applicable to various solar cell and photovoltaic panel designs. For example, FIG. 13 shows a schematic diagram of a photovoltaic panel 500E in accordance with an embodiment of the present invention. The photovoltaic panel 500E is a particular implementation of the photovoltaic panel 500 of FIG. 5.

In the example of FIG. 13, the photovoltaic panel 500E comprises a plurality of series-connected solar cells 10. A solar cell 10 may be a conventional backside contact or front side contact solar cell. Each of the diodes D15-D18 serves as a protective bypass diode for a corresponding group of solar cells. In the example of FIG. 13, a positive node of the photovoltaic panel 500E is at the cathode of the diode D15 and a negative node of the photovoltaic panel 500E is at the anode of the diode D18. Similar to the photovoltaic panel 500B of FIG. 9, in safety shutdown mode, the photovoltaic panel 500E shorts some of the solar cells 10 but leaves some of the solar cells 10 operational to continue providing power for a corresponding rapid shutdown control circuit.

In the example of FIG. 13, the switch 580 is normally open during normal operation, thereby providing the panel voltage across the positive and negative nodes. In response to detecting an initiation event, safety shutdown mode is entered by closing the switch 580, thereby shorting out the solar cells between the cathode of the diode D15 and the anode of the diode D17. During safety shutdown mode, the solar cells across the diode D18 are not shorted out and accordingly remains operational to provide a supply voltage to a corresponding rapid shutdown control circuit.

Figure 14:
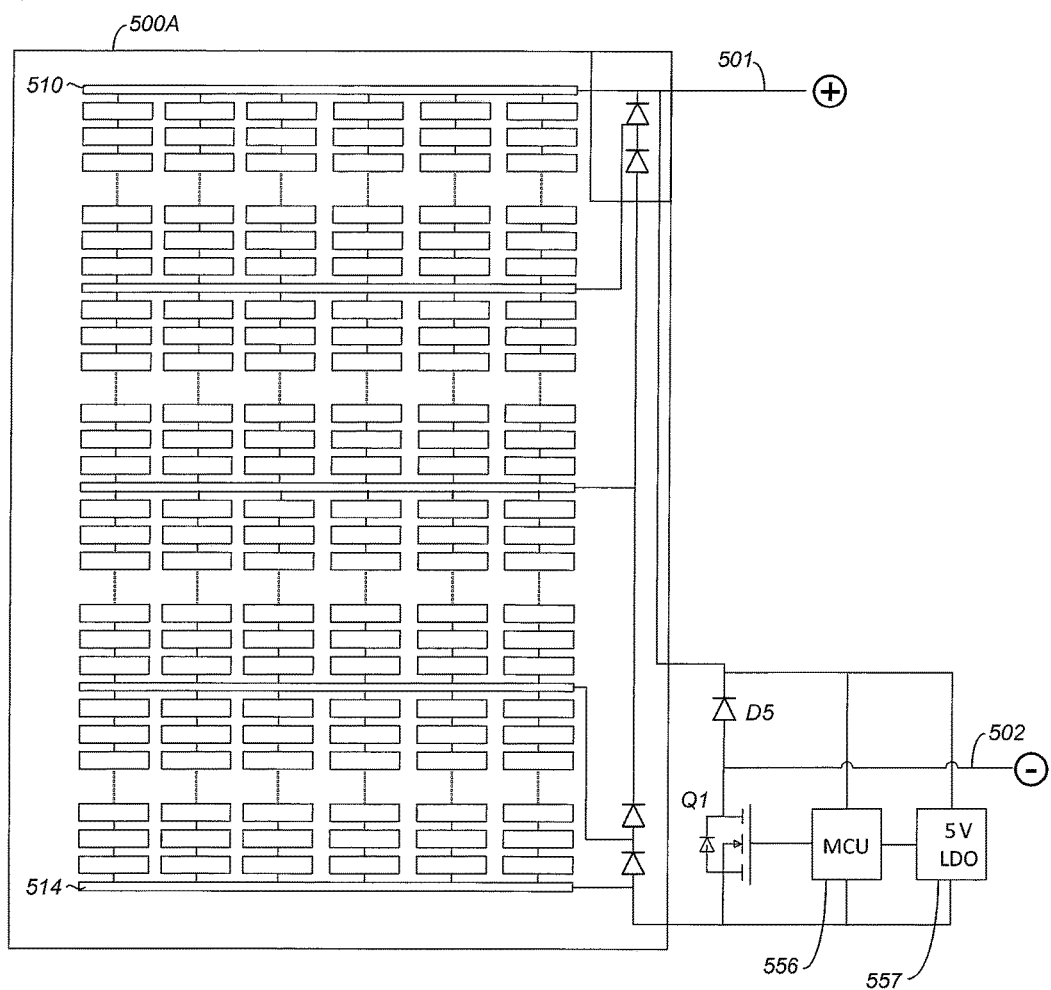
FIG. 14 shows the photovoltaic panel of FIG. 6 with a rapid shutdown control circuit for switching out solar cells in accordance with an embodiment of the present invention.

FIG. 14 shows the photovoltaic panel 500A of FIG. 6 with a rapid shutdown control circuit for switching out solar cells in accordance with an embodiment of the present invention. In the example of FIG. 14, a transistor Q1 (e.g., metal oxide semiconductor transistor (MOSFET)), serves as the switch device (see FIG. 8) for disconnecting the photovoltaic panels 500A from the photovoltaic system in safety shutdown mode. In the example of FIG. 14, the rapid shutdown control circuit, which includes a controller 556 (e.g., a microcontroller) and a power supply 557 (e.g., low dropout regulator (LDO)), is configured to control the conduction of the transistor Q1. In the example of FIG. 14, the transistor Q1, the controller 556, and the power supply 557 share a common reference. The power supply 557, which provides supply voltage for powering the controller 556, receives an input supply voltage from one or more solar cells of the photovoltaic panel 500A. The power supply 557 may comprise a buck or boost converter depending on the input supply voltage received by the power supply 557 and the power requirements of the rapid shutdown control circuit. In the example of FIG. 14, the power supply 557 receives an input supply voltage from the panel voltage across the bus bars 510 and 514. The controller 556 turns on the transistor Q1 during normal operation to provide the panel voltage across the positive node 501 and the negative node 502. In response to detecting an initiation event, the controller 556 enters safety shutdown mode by turning off the transistor Q1 to disconnect the photovoltaic panel 500A by removing ground reference from the negative node 502.

Figure 15:
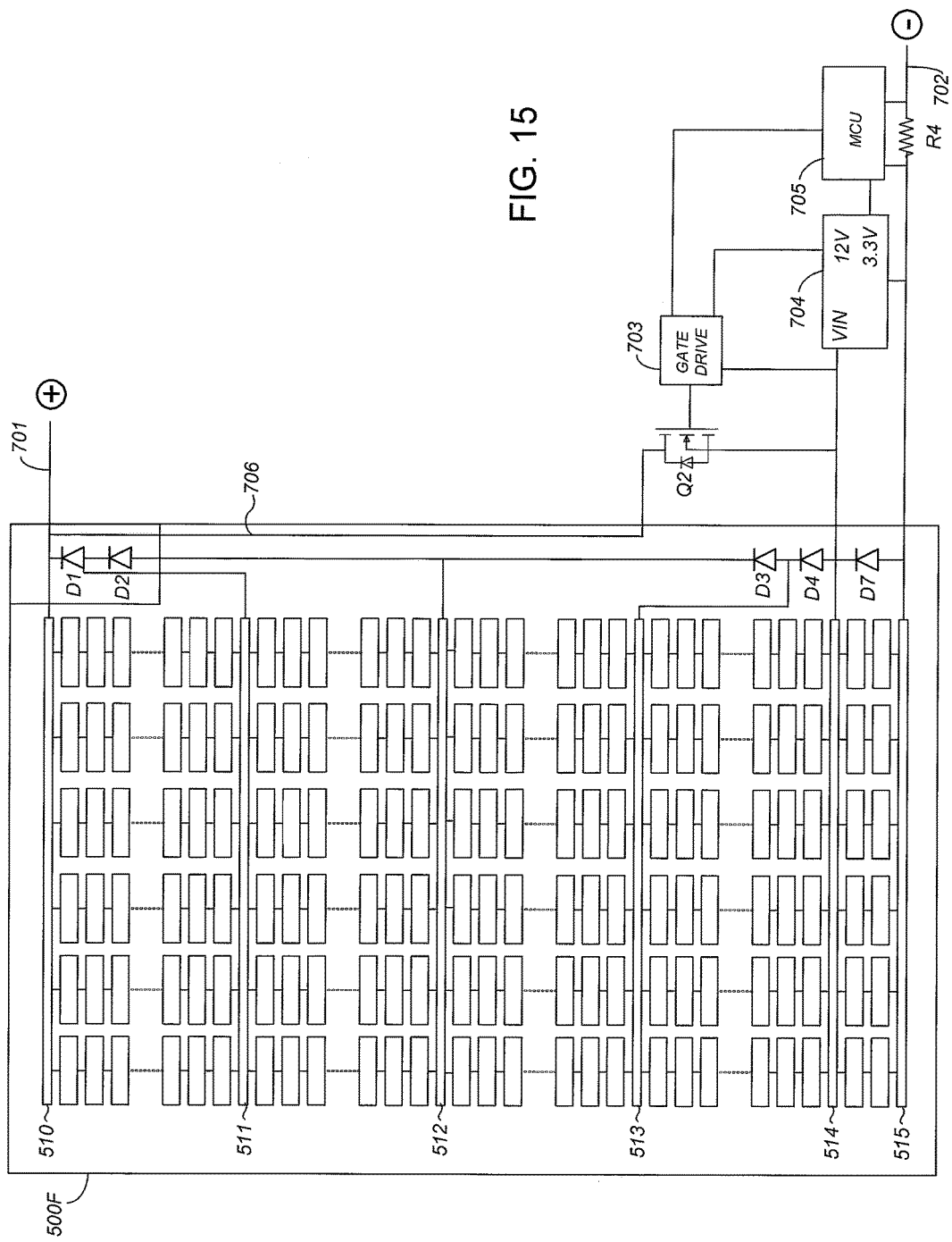
FIG. 15 shows a photovoltaic panel in accordance with another embodiment of the present invention.

FIG. 15 shows a photovoltaic panel 500F in accordance with an embodiment of the present invention. The photovoltaic panel 500F is a particular implementation of the photovoltaic panel 500 of FIG. 5. In the example of FIG. 15, similar to the photovoltaic panel 500B of FIG. 9, the photovoltaic panel 500F provides supply cells between the bus bars 514 and 515. Also, in the photovoltaic panel 500F, the wire 706 that connects the positive node 701 to a transistor Q2 is internal to the photovoltaic panel 500F. The photovoltaic panel 500F is otherwise the same as the photovoltaic panel 500B of FIG. 9.

In the example of FIG. 15, the transistor Q2 (e.g., MOSFET) serves as the switch device for switching the solar cells in and out. A rapid shutdown control circuit comprises a gate drive circuit 703 for driving the transistor Q2, a controller 705 (e.g., microcontroller), and a power supply 704 for powering the gate drive circuit 703 and the controller 705. In the example of FIG. 5, the power supply 704 receives an input supply voltage VIN from the supply cells between the bus bars 514 and 515. The power supply 704 provides a supply voltage (e.g., 3.3V) to the controller 705 and another supply voltage (e.g., 12V) to the gate drive circuit 703.

During normal operation, the controller 705 turns off the transistor Q2 so that the panel voltage is provided across the positive node 701 and the negative node 702. The panel current flows to a sense resistor R4. The controller 705 may monitor the voltage across the sense resistor R4 to detect an initiation event, such as the panel current going down to zero. In response to detecting the initiation event, the controller 705 enters safety shutdown mode by turning on the transistor Q2, thereby shorting out the solar cell from the bus bar 510 to the bus bar 514. The controller 705 may detect a trigger release signal from the voltage across the sense resistor R4. In response to detecting the trigger release signal, the controller 705 may turn off the transistor Q2 to resume normal operation.

In the example of FIG. 15, because the supply cells are in series with shorted solar cells, the transistor Q2 and the power supply 704 do not share the same reference. Because of system voltage constraints, the input supply voltage provided by the supply cells between the bus bars 514 and 515 may be too low to generate adequate supply voltage for the gate drive circuit 503 and the controller 705. In that case, the power supply 704 may have a boost topology.

Figure 16:
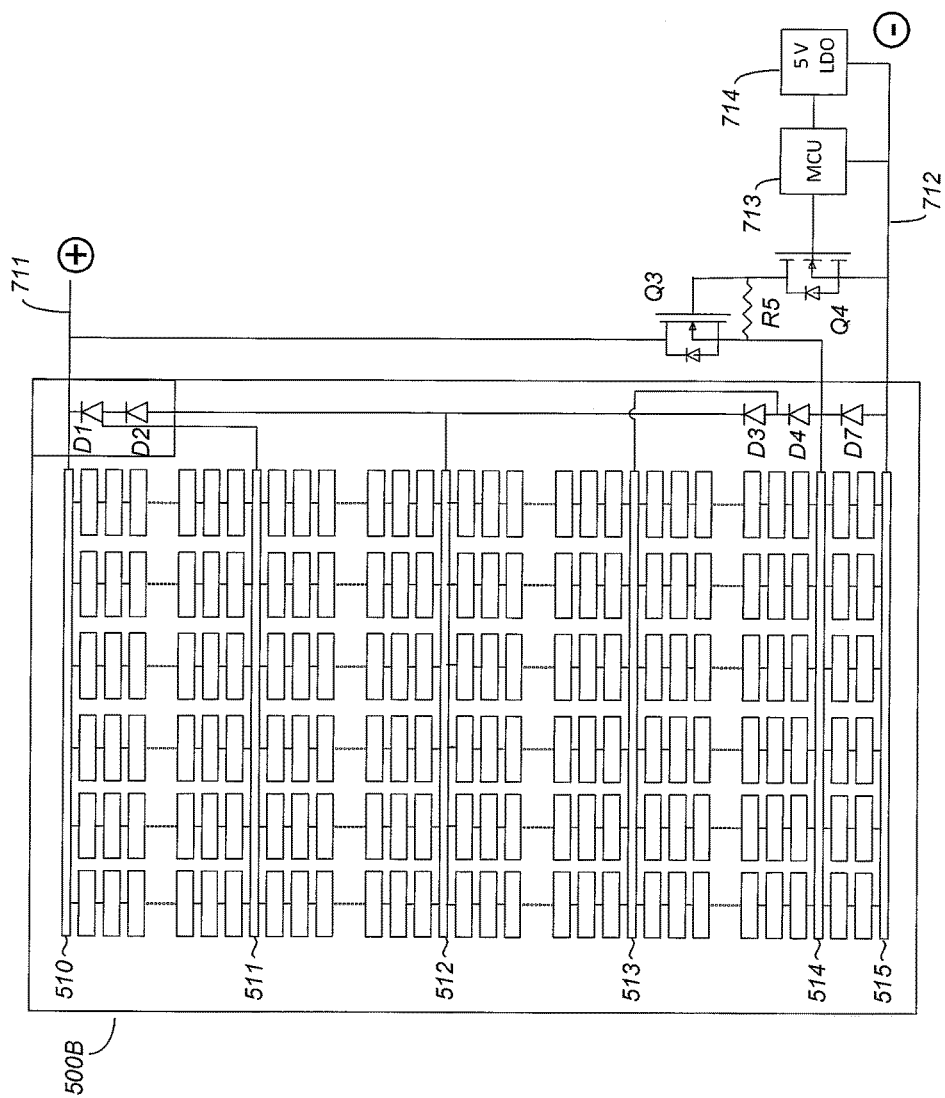
FIG. 16 shows the photovoltaic panel of FIG. 9 with a rapid shutdown control circuit in accordance with an embodiment of the present invention.

FIG. 16 shows the photovoltaic panel 500B of FIG. 9 with a rapid shutdown control circuit in accordance with an embodiment of the present invention. In the example of FIG. 16, a transistor Q3 serves as the switch device. In one embodiment, the transistor Q3 is a depletion-mode MOSFET, which is a normally-on switch device. Other normally-on switch devices, such as a JFET, may also be used. To turn off the transistor Q3, the gate-to-source voltage VGS of the transistor Q3 is driven to approximately −3V. In the example of FIG. 16, the transistor Q3 is driven by a transistor Q4, which is a normally-off switch device, such as an enhancement-mode MOSFET.

During normal operation, the transistor Q4 is on to provide a gate-to-source voltage VGS of about −3V across the resistor R5 for the transistor Q3, thereby turning off the transistor Q3 and providing the panel voltage across a positive node 711 and a negative node 712. In response to detecting an initiation event, safety shutdown mode is entered by turning off the transistor Q4 to turn on the transistor Q3, thereby shorting the solar cells between the bus bars 510 and 514. The power supply 714 (e.g., low dropout regulator) receives an input supply voltage from the solar cells between the bus bars 514 and 515 to generate a supply voltage for the controller 713 (e.g., microcontroller). The controller 713 controls the conduction of the transistor Q4 to control the conduction of the transistor Q3.

In the example of FIG. 16, the controller 713 and the power supply 714 share a common reference with the transistor Q4 to simplify the power supply design. Depending on the input supply voltage provided by the supply cells, the power supply 714 may employ boost topology to generate adequate supply voltage for the controller 713. In the example of FIG. 16, using a normally-on switch device to short the solar cells in safety shutdown mode has the advantage of defaulting to a safe state when power to the rapid shutdown control circuit is lost.

Generally speaking, a diode in the above-described photovoltaic panels may be replaced by a switch device, such as a MOSFET. A switch device for switching solar cells in and out of the photovoltaic system may be implemented using a MOSFET, junction gate field effect transistor (JFET), insulated gate bipolar transistor (IGBT), or other types of transistors. Normally-on type transistors, such as depletion-mode MOSFETs or JFETs, are especially beneficial in shorting implementations as these transistors will revert to shorting the solar cells (and lowering the panel voltage) in the event of rapid shutdown control circuit malfunction or power failure. In disconnect implementations, the transistor and diode (or another transistor) may be used to form a buck converter and track the photovoltaic panel's maximum power point.

Solar cells may be switched out from the photovoltaic system by shorting the solar cells or disconnecting the solar cells from the photovoltaic system. In embodiments where shorting is employed, the rapid shutdown control circuit and the switch device may be integrated into the photovoltaic panel to prevent the rapid shutdown control circuit and switch device from being accidentally removed, thereby posing a safety issue where the solar cells cannot be shorted out for rapid shutdown. With disconnect embodiments, the solar cells will be disconnected when the rapid shutdown control circuit and switch device are accidentally removed, which simply lowers the system voltage (i.e., output voltage of the photovoltaic system). For redundancy in shorting embodiments, two normally-on switch devices may be put in parallel. For redundancy in disconnect embodiments, two normally-off switch devices can be put in series. A rapid shutdown control circuit may receive an enable signal from the inverter or a main controller of the photovoltaic system during normal operation, and initiate rapid shutdown when the enable signal is lost. The enable signal may be received over a wired connection, wireless connection, or some other communication channel.

Figure 17:
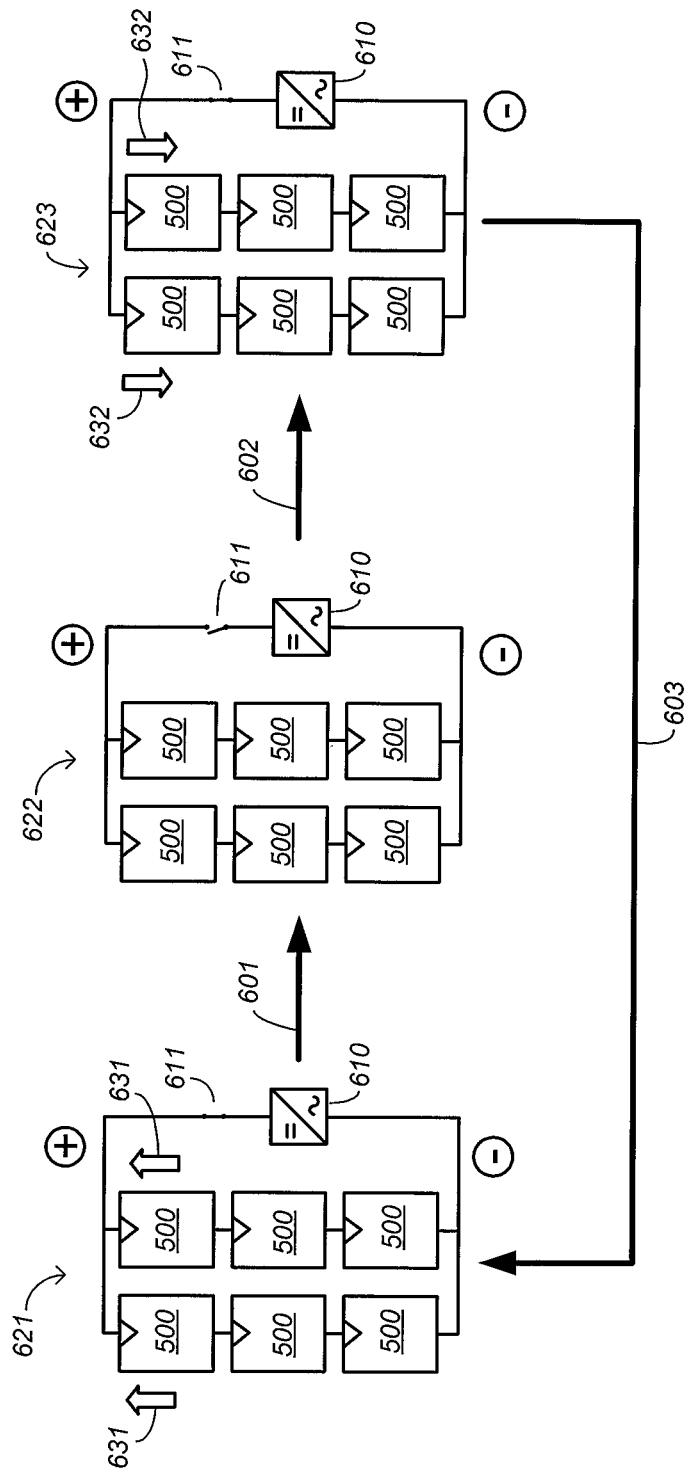
FIG. 17 shows a flow diagram that schematically illustrates operation of a photovoltaic system in accordance with an embodiment of the present invention.

FIG. 17 shows a flow diagram that schematically illustrates operation of a photovoltaic system in accordance with an embodiment of the present invention. In the example of FIG. 17, the photovoltaic system includes an inverter 610 and a plurality of photovoltaic panels 500 (e.g., 500, 500A, 500B, etc.). In the example of FIG. -17, two strings of series-connected photovoltaic panels 500 are connected in parallel. The number of photovoltaic panels 500 and their arrangement in the photovoltaic system may vary depending on the application.

In the example of FIG. 17, the photovoltaic system may start in a normal operating mode 621, wherein the inverter 610 draws forward current 631 from the photovoltaic panels 500. A switch 611 is closed when the photovoltaic system is in the normal operating mode 621. Corresponding rapid shutdown control circuits may detect the forward current 631 to enter normal operating mode 621.

The photovoltaic system may transition 601 to enter safety shutdown mode 622 in response to detecting an initiation event, which indicates initiation of rapid shutdown of the photovoltaic system. The initiation event may be the system current (which is detected by a rapid shutdown control circuit as the panel current) dropping down to zero. The system current may drop down to zero when the inverter 610 is shutdown, which is represented by opening the switch 611. Rapid shutdown control circuits may detect the initiation event to enter safety shutdown mode 622.

In the example of FIG. 17, the photovoltaic system may transition 602 to reverting mode 623 to return to normal operation. The switch 611 is closed in the reverting mode 623 to indicate that the inverter 610 is ready to revert back to the normal operating mode 621 to resume normal operation. In the example of FIG. 17, to revert back to the normal operating mode 621, the inverter 610 feeds a reverse current 632 to the photovoltaic panels 500. The rapid shutdown circuits detect the reverse current 632 and, in response, transitions 603 to the normal operating mode 621. The inverter 610 may also draw forward current 631 from the photovoltaic panels 500 to indicate resumption to the normal operating mode 621. That is, drawing the forward current 631 or feeding the reverse current 632 may serve as a trigger release signal for resuming normal operation.

In the example of FIG. 17, two strings of series-connected photovoltaic panels 500 are connected in parallel. In some installations, current may circulate between strings of photovoltaic panels when the inverter is shutdown. The circulating current may be due to panel mismatch, shading, degradation, or other reasons. In that case, it may be difficult to detect the mode of the photovoltaic system from the string current. In those cases, a different release signal may be employed or the photovoltaic system may be limited to a single string of series-connected photovoltaic panels.

Figure 18:
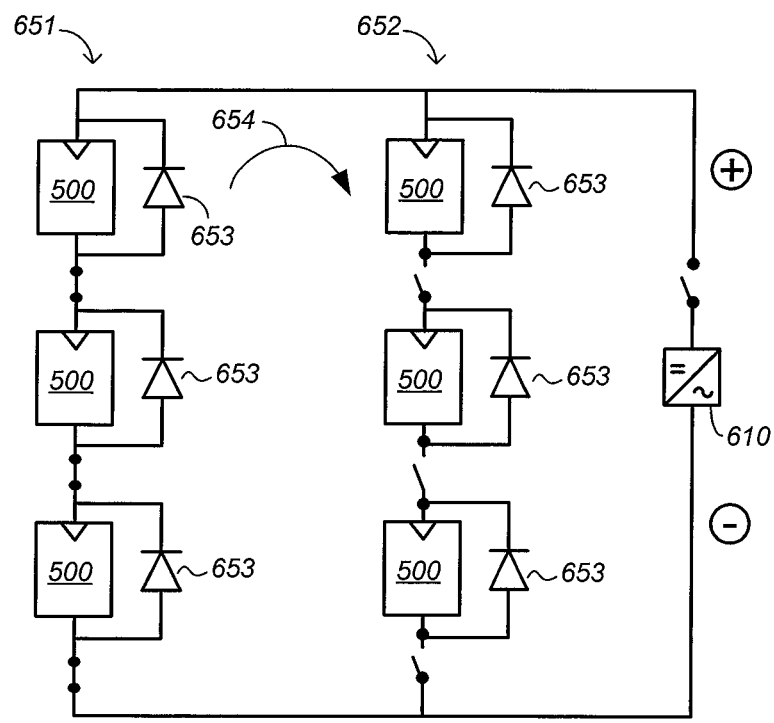
FIG. 18 shows a schematic diagram of a photovoltaic system in accordance with an embodiment of the present invention.

FIG. 18 shows a schematic diagram of a photovoltaic system in accordance with an embodiment of the present invention. In the example of FIG. 18, the photovoltaic system includes strings 651 and 652 of series-connected photovoltaic panels and the photovoltaic inverter 610. In the example of FIG. 18, the photovoltaic panels 500 (and thus the solar cells therein) are switched in and out of the photovoltaic system by disconnection as previously described. In the example of FIG. 18, a diode 653 is across each photovoltaic panel 500 to prevent circulating current when the photovoltaic system is in safety shutdown mode due to rapid shutdown. That is, the diodes 653 block reverse currents, thereby preventing circulating current from flowing from one string to another. As a particular example, the diodes 653 of the string 652 block circulating current 654 from the string 651.

Figure 19:
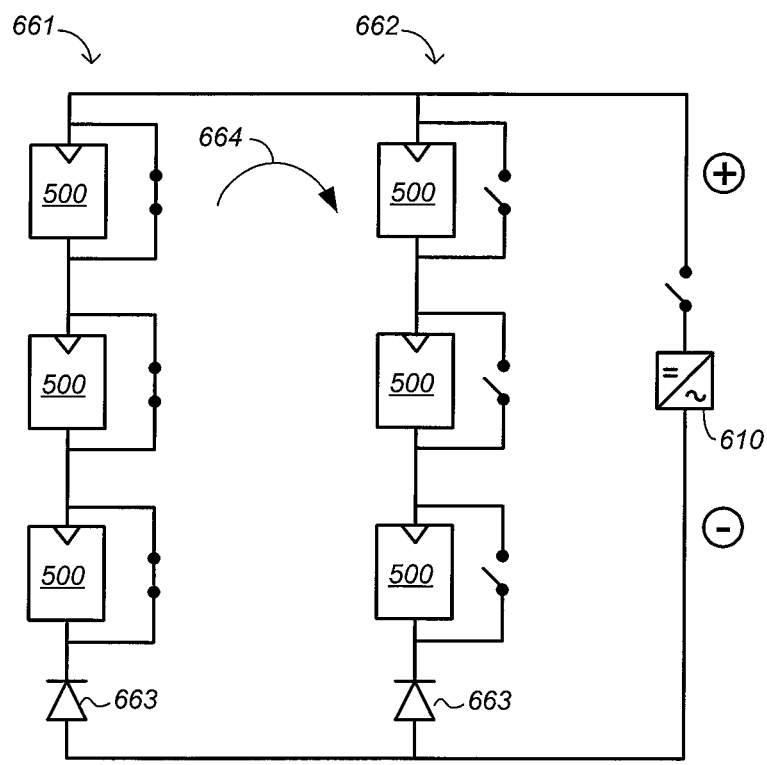
FIG. 19 shows a schematic diagram of a photovoltaic system in accordance with an embodiment of the present invention.

FIG. 19 shows a schematic diagram of a photovoltaic system in accordance with an embodiment of the present invention. In the example of FIG. 19, the photovoltaic system includes strings 661 and 662 of series-connected photovoltaic panels and the photovoltaic inverter 610. In the example of FIG. 19, the photovoltaic panels 500 (and thus the solar cells therein) are switched in and out of the photovoltaic system by shorting as previously described. In the example of FIG. 19, a diode 663 is in series with each string to prevent circulating current when the photovoltaic system is in safety shutdown mode due to rapid shutdown. That is, the diodes 663 block reverse currents, thereby preventing circulating current from flowing from one string to another. As a particular example, the diode 663 of the string 662 block circulating current 664 from the string 661. The circulating current 664 may be from supply cells or other solar cells that are not switched out in safety shutdown mode.

Figure 20:
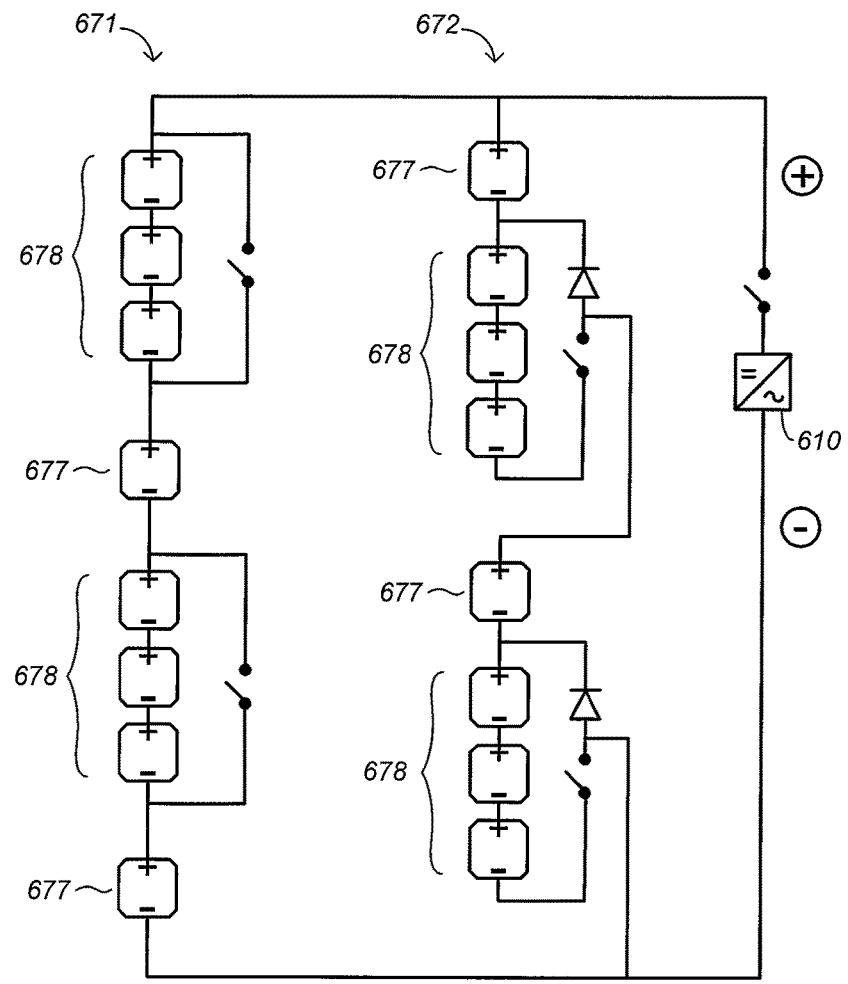
FIG. 20 shows a schematic diagram of a photovoltaic system in accordance with an embodiment of the present invention.

FIG. 20 shows a schematic diagram of a photovoltaic system in accordance with an embodiment of the present invention. In the example of FIG. 20, the photovoltaic system includes strings 671 and 672 of series-connected solar cells 678 and the photovoltaic inverter 610. The solar cells 678 of the string 671 are switched in and out of the photovoltaic system by shorting, and the solar cells 678 of the string 672 are switched in and out of the photovoltaic system by disconnection. The solar cells 678 form a first group of solar cells, and the solar cells 677 form a second group of solar cells. The solar cells 677 serve as supply cells for providing power to rapid shutdown control circuits. In one embodiment, the solar cells 677 also provide auxiliary power (e.g., approx. 30V) to the photovoltaic panel 610 to power inverter control circuitry. This is advantageous because the AC grid may not be able to provide power to the photovoltaic inverter 610 during rapid shutdown events.

Figure 21:
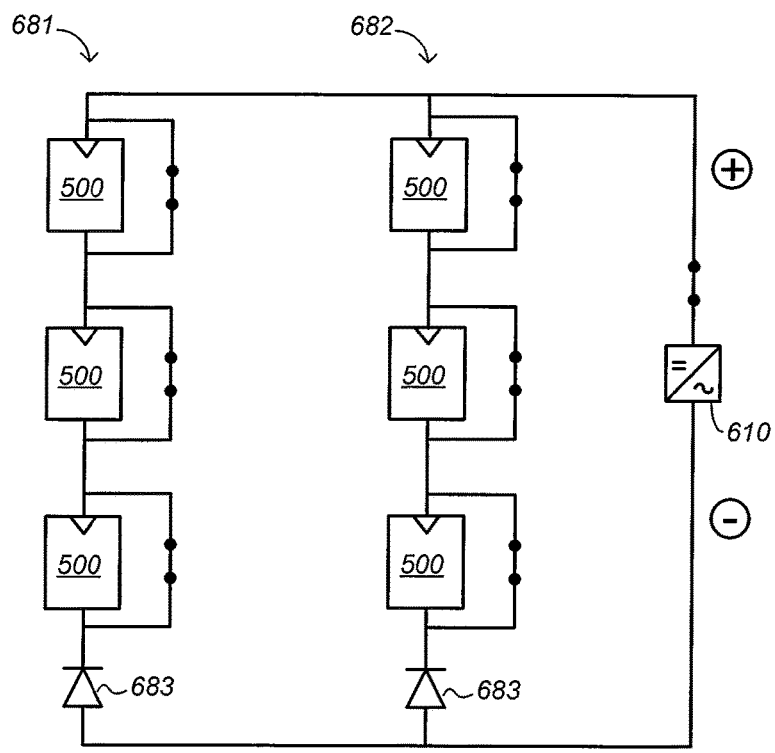
FIG. 21 shows a schematic diagram of a photovoltaic system in accordance with an embodiment of the present invention.

FIG. 21 shows a schematic diagram of a photovoltaic system in accordance with an embodiment of the present invention. In the example of FIG. 21, the photovoltaic system includes strings 681 and 682 of series-connected photovoltaic panels and the photovoltaic inverter 610. In the example of FIG. 21, the photovoltaic panels 500 (and thus the solar cells therein) are switched in and out of the photovoltaic system by shorting as previously described. In the example of FIG. 21, a diode 683 is in series with each string to facilitate detection of the release trigger that indicates resumption of normal operation. More particularly, to resume normal operation, the photovoltaic inverter 610 may generate reverse current to charge the capacitance of the array of photovoltaic panels 500. The resulting array voltage is distributed to all of the photovoltaic panels 500, and each photovoltaic panel 500 would detect an increase in the panel voltage. Rapid shutdown control circuits may detect this voltage increase as a release trigger to resume normal operation by removing the shorts across the photovoltaic panels 500.

Photovoltaic systems with rapid shutdown have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A photovoltaic system comprising:
   a photovoltaic panel comprising a first group of solar cells, the photovoltaic panel being configured to generate a panel voltage and a panel current; and
   a control circuit configured to detect initiation of a rapid shutdown of the photovoltaic system by detecting a shutdown of a photovoltaic inverter, to lower the panel voltage below a safety level in response to detecting initiation of the rapid shutdown by switching out the first group solar cells, to monitor a line that connects the panel voltage to the photovoltaic inverter for a release trigger signal indicating resumption of normal operation, and to switch back the first group of solar cells to restore the panel voltage back to a normal operating level in response to detecting the release trigger signal on the line.

2. The photovoltaic system of claim 1, wherein the photovoltaic panel further comprises a second group of solar cells that are not switched out in response to detecting the initiation of the rapid shutdown, and the control circuit is powered by the second group of solar cells, and
   wherein the release trigger signal is a reverse current generated by the photovoltaic inverter, and wherein the reverse current flows in a direction opposite to that of the panel current.

3. The photovoltaic system of claim 1, wherein the control circuit comprises a switch device and the control circuit controls the switch device to short out the first group of solar cells in response to detecting the initiation of the rapid shutdown.

4. The photovoltaic system of claim 3, wherein the switch device is a normally-on transistor.

5. The photovoltaic system of claim 1, wherein the control circuit comprises a switch device and the control circuit switches out the first group of solar cells by controlling the switch device to disconnect the first group of solar cells from the photovoltaic system.

6. The photovoltaic system of claim 5, wherein the switch device is a transistor, and the control circuit turns off the transistor to disconnect the first group of solar cells from the photovoltaic system.

7. The photovoltaic system of claim 1, wherein the photovoltaic inverter is configured to send the release trigger signal to the control circuit.

8. The photovoltaic system of claim 7, wherein the release trigger comprises a ripple voltage initiated by the photovoltaic inverter.

9. The photovoltaic system of claim 1, wherein the control circuit detects the initiation of the rapid shutdown by detecting the panel current dropping to zero and remaining at zero for at least a predetermined time.

10. A method of operating a photovoltaic system, the method comprising:
    monitoring a panel voltage and a panel current of a photovoltaic panel;
    detecting initiation of a rapid shutdown of the photovoltaic system;
    in response to detecting initiation of the rapid shutdown, entering safety shutdown mode by switching out a group of solar cells of the photovoltaic panel to lower the panel voltage below a safety level;
    monitoring a line that connects the panel voltage to a photovoltaic inverter for a release trigger signal that indicates-resumption of a normal operation; and
    in response to detecting the release trigger signal, resuming the normal operation by switching back the group of solar cells to restore the panel voltage to a normal operating voltage level above the safety level.

11. The method of claim 10, wherein switching out the group of solar cells comprises shorting out the group solar cells.

12. The method of claim 10, wherein switching out the group of solar cells comprises disconnecting the group of solar cells.

13. The method of claim 10, further comprising:
    during the safety shutdown mode, powering a control circuit that monitors the line for the release trigger signal using another group of solar cells,
    wherein the release trigger signal is a reverse current generated by the photovoltaic inverter and wherein the reverse current flows in a direction opposite to that of the panel current.

14. The method of claim 10, wherein detecting the initiation of the rapid shutdown comprises:
    detecting that the panel current drops to zero.

15. The method of claim 10, wherein monitoring the line comprises:
    monitoring the line for presence of a ripple voltage.

16. The method of claim 10, wherein monitoring the line comprises:
    monitoring the line for current initiated by the photovoltaic panel.

17. A control circuit for a photovoltaic panel of a photovoltaic system, the control circuit comprising:
    a switch device that is coupled to switch a first group of solar cells in and out of the photovoltaic panel; and
    a controller that is configured to detect initiation of a rapid shutdown of the photovoltaic system, to control the switch device to lower the panel voltage below a safety level in response to detecting initiation of the rapid shutdown by switching out the first group of solar cells, to monitor a line that connects the panel voltage to a photovoltaic inverter for a release trigger signal indicating resumption of normal operation, and to control the switch device to restore the panel voltage back to a normal operating level in response to detecting the release trigger signal by switching in the first group of solar cells.

18. The control circuit of claim 17, wherein the switch device comprises a normally-on transistor.

19. The control circuit of claim 17, wherein the control circuit is configured to detect the initiation of the rapid shutdown by monitoring a panel current of the photovoltaic panel and detecting the initiation of the rapid shutdown when the panel current drops to zero.

20. The control circuit of claim 17, wherein the release trigger signal comprises a ripple voltage initiated by a photovoltaic inverter.

* * * * *